(12) United States Patent
Menon et al.

(10) Patent No.: US 10,200,264 B2
(45) Date of Patent: Feb. 5, 2019

(54) LINK STATUS MONITORING BASED ON PACKET LOSS DETECTION

(71) Applicant: 128 Technology, Inc., Burlington, MA (US)

(72) Inventors: Abilash Menon, Boxborough, MA (US); Robert Penfield, Concord, MA (US); Hadriel S. Kaplan, Nashua, NH (US); Patrick Timmons, Newton, MA (US)

(73) Assignee: 128 Technology, Inc., Burlington, MA (US)

( * ) Notice: Subject to any disclaimer, the term of this patent is extended or adjusted under 35 U.S.C. 154(b) by 83 days.

(21) Appl. No.: 15/168,877

(22) Filed: May 31, 2016

(65) Prior Publication Data

US 2017/0346709 A1     Nov. 30, 2017

(51) Int. Cl.
*H04L 12/26* (2006.01)
*H04L 12/939* (2013.01)

(52) U.S. Cl.
CPC ...... *H04L 43/0829* (2013.01); *H04L 43/0811* (2013.01); *H04L 43/10* (2013.01); *H04L 49/555* (2013.01)

(58) Field of Classification Search
CPC .......................... H04L 43/0829; H04L 43/0811
See application file for complete search history.

(56) References Cited

U.S. PATENT DOCUMENTS

| | | |
|---|---|---|
| 6,515,963 B1 | 2/2003 | Bechtolsheim et al. |
| 6,563,824 B1 | 5/2003 | Bhatia et al. |
| 6,584,071 B1 | 6/2003 | Kodialam et al. |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar |
| 7,218,632 B1 | 5/2007 | Bechtolsheim et al. |

(Continued)

FOREIGN PATENT DOCUMENTS

| | | |
|---|---|---|
| CN | 101552703 A | 10/2009 |
| CN | 101646220 A | 2/2010 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Yemane Mesfin
*Assistant Examiner* — Henry Baron
(74) *Attorney, Agent, or Firm* — Nutter McClennan & Fish LLP

(57) ABSTRACT

In exemplary embodiments of the present invention, special metadata is added to link monitoring protocol messages exchanged by pairs of adjacent nodes to allow such nodes to detect communication link failures and determine whether the failure affects an incoming communication link or an outgoing communication link. The link monitoring protocol messages may be augmented BFD messages.

21 Claims, 28 Drawing Sheets

(56) References Cited

U.S. PATENT DOCUMENTS

| | | | |
|---|---|---|---|
| 7,315,541 | B1 | 1/2008 | Housel et al. |
| 7,373,660 | B1 | 5/2008 | Guichard et al. |
| 7,466,703 | B1 | 12/2008 | Arunachalam et al. |
| 7,536,720 | B2 | 5/2009 | Burdett et al. |
| 7,634,805 | B2 | 12/2009 | Aroya |
| 7,706,411 | B2 | 4/2010 | Wakumoto et al. |
| 7,730,301 | B2 | 6/2010 | Correll et al. |
| 7,773,611 | B2 | 8/2010 | Booth, III et al. |
| 7,872,973 | B2 | 1/2011 | Sterne et al. |
| 7,949,785 | B2 | 5/2011 | Alkhatib et al. |
| 8,068,417 | B1 | 11/2011 | Roberts |
| 8,094,560 | B2 | 1/2012 | Bagepalli et al. |
| 8,139,479 | B1 | 3/2012 | Raszuk |
| RE44,119 | E | 4/2013 | Wang et al. |
| 8,437,248 | B2 | 5/2013 | Li et al. |
| 8,527,641 | B2 | 9/2013 | Degaonkar et al. |
| 8,570,893 | B2 | 10/2013 | Guo et al. |
| 8,584,199 | B1 | 11/2013 | Chen et al. |
| 8,634,428 | B2 | 1/2014 | Le Pennec et al. |
| 8,804,489 | B2 | 8/2014 | Lu et al. |
| 8,942,085 | B1 | 1/2015 | Pani et al. |
| 8,989,020 | B2 | 3/2015 | So |
| 9,059,920 | B2 | 6/2015 | Ravindran et al. |
| 9,160,652 | B2 | 10/2015 | Taillon et al. |
| 9,240,953 | B2 | 1/2016 | Carlstrom |
| 9,276,864 | B1 | 3/2016 | Vincent |
| 2001/0030649 | A1 | 10/2001 | Mamiya et al. |
| 2002/0044553 | A1 | 4/2002 | Chakravorty |
| 2002/0075883 | A1 | 6/2002 | Dell et al. |
| 2002/0176363 | A1 | 11/2002 | Durinovic-Johri et al. |
| 2003/0198189 | A1 | 10/2003 | Roberts et al. |
| 2003/0214938 | A1 | 11/2003 | Jindal et al. |
| 2004/0088542 | A1 | 5/2004 | Daude et al. |
| 2004/0264481 | A1 | 12/2004 | Darling et al. |
| 2005/0036616 | A1 | 2/2005 | Huang et al. |
| 2005/0063307 | A1 | 3/2005 | Samuels et al. |
| 2005/0182932 | A1 | 8/2005 | Wheeler |
| 2005/0238022 | A1 | 10/2005 | Panigrahy |
| 2006/0176894 | A1 | 8/2006 | Oh et al. |
| 2007/0171825 | A1 | 7/2007 | Roberts et al. |
| 2007/0171826 | A1 | 7/2007 | Roberts et al. |
| 2007/0253418 | A1 | 11/2007 | Shiri et al. |
| 2008/0159145 | A1 | 6/2008 | Muthukrishnan et al. |
| 2008/0214175 | A1 | 9/2008 | Papadoglou et al. |
| 2009/0007021 | A1 | 1/2009 | Hayton |
| 2009/0059958 | A1 | 3/2009 | Nakata |
| 2010/0125898 | A1 | 5/2010 | Dubuc et al. |
| 2010/0191968 | A1 | 7/2010 | Patil et al. |
| 2011/0069714 | A1 | 3/2011 | Le Pennec et al. |
| 2012/0144061 | A1 | 6/2012 | Song |
| 2012/0236860 | A1 | 9/2012 | Kompella et al. |
| 2013/0227166 | A1 | 8/2013 | Ravindran et al. |
| 2013/0229922 | A1 | 9/2013 | Li et al. |
| 2013/0230051 | A1* | 9/2013 | Lockwood ............... H04L 1/22 370/394 |
| 2013/0297824 | A1 | 11/2013 | Lan et al. |
| 2014/0040488 | A1 | 2/2014 | Small et al. |
| 2015/0188814 | A1 | 7/2015 | Jain et al. |
| 2015/0229618 | A1 | 8/2015 | Wan et al. |
| 2015/0381324 | A1 | 12/2015 | Mirsky et al. |
| 2016/0036694 | A1 | 2/2016 | Abdul et al. |
| 2016/0094444 | A1 | 3/2016 | MeLampy et al. |
| 2016/0105471 | A1 | 4/2016 | Nunes et al. |
| 2016/0344565 | A1 | 11/2016 | Batz et al. |
| 2016/0344803 | A1 | 11/2016 | Batz et al. |
| 2017/0063927 | A1 | 3/2017 | Schultz et al. |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1 313 267 B1 | 12/2006 |
| GB | 1473898 A * | 5/1977 ............... H04L 1/18 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |

OTHER PUBLICATIONS

Bjorklund, *Yang—A Data Modeling Language for the Network Configuration Protocol (NETCONF)*, Internet Engineering Task Force (IETF), Request for Comments 6020, ISSN: 2070-1721, 173 pages, Oct. 2010.

Caida, *Observing routing asymmetry in Internet traffic*, (www.caida.org/research/traffic-analysis/asymmetry/1), 7 pages, dated Jul. 17, 2013.

Chiosi, et al, *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, 4 pages, printed Jun. 17, 2015.

Data Plane Development Kit, *Programmer's Guide*, Release 16.04.0, 216 pages, Apr. 12, 2016.

Davis, *Layer 3 Switches Explained*, Happy Router, 6 pages, dated Aug. 30, 2007.

Filsfils, et al., *Segment Routing Architecture*, Network Working Group, Draft, 28 pages, Oct. 21, 2013.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Herbert, *xps: Transmit Packet Steering*, Eklektix, Inc., 11 pages, Oct. 26, 2010.

Iana, *Transmission Control Protocol (TCP) Parameters*, (www.iana.org/assignments/tcp-parameters/tcp-parameters.xhtm), 5 pages, dated Sep. 22, 2014.

Katz et al., *Bidirectional Forwarding Detection (BFD)*, Internet Engineering Task Force (IETF), Request for Comments 5880, ISSN: 2070-1721, Juniper Networks, 49 pages, Jun. 2010.

Klement, *1.2 Overview of a TCP communications session*, RPG IV Socket Tutorial (http://www.scottklement.com/rpg/socketut/overview), 2 pages, 2001.

Microsoft, *Introduction to Receive Side Scaling*, Developer Resources, https://msdn.microsoft.com/en-us/library/windows/hardware/ff556942(v=vs.85).aspx, 3 pages, Apr. 2014.

Microsoft, *RSS with a Single Hardware Receive Queue*, Developer Resources, https://msdn.microsoft.com/en-us/library/windows/hardware/ff570727(v=vs.85).aspx, 2 pages, Jan. 2015.

Microsoft, *RSS with Hardware Quelling*, Developer Resources, https://msdn.microsoft.com/en-us/library/windows/hardware/ff570728(v=vs.85).aspx, 2 pages, Jan. 2015.

Microsoft, *Non-RSS Receive Processing*, Developer Resources, https://msdn.microsoft.com/en-us/library/windows/hardware/ff568798(v=vs.85).aspx, 2 pages, Jan. 2015.

PC Magazine Encyclopedia, *Definition of: TCP/IP abc's*, PC Magazine Encyclopedia (www.pcmag.com/encyclopedia/term/52615), 5 pages, 2005.

Previdi, et al., *IPv6 Segment Routing Header (SRH)*, Network Working Group, Draft, 24 pages, Jul. 3, 2014.

Roberts, *The Next Generation of IP—Flow Routing*, SSGRR 2003S International Conference, L'Aquila, Italy, 11 pages, Jul. 29, 2003.

Rouse, *What is routing table?* Posted by Margaret Rouse (http://searchnetworking.techtarget.com/definition/routing-table), 5 pages, Apr. 2007.

Shang, et al., *Making Better Use of All Those TCP ACK Packets*, Computer Science Department, Worcester Polytechnic Institute, 10 pages, 2005.

(56) References Cited

OTHER PUBLICATIONS

Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architecturesz*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management*https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/US2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—Application No. PCT/US2016/026938, dated Jul. 28, 2016, together with the Written Opinion of the International Searching Authority, 9 pages.

\* cited by examiner

AIPR 1  708

Session X

Return Association (RA)

SSA   1.1.1.1

SSP   10

SDA   5.5.5.5

SDP   20

SPR   100

Forward Association (FA)

SSA   2.2.2.2     (implicit)

SSP   30         (session source port assigned by AIPR 1  708)

SDA   3.3.3.3     (next node address - AIPR 2  714)

SDP   40         (session destination port assigned by AIPR 1  708)

SPR   100

Flag = First Waypoint AIPR

Session Y

RA

FA

Flag

Session Z

RA

FA

Flag

*FIG. 9*

AIPR 2  714

Session X

Return Association (RA)

SSA    2.2.2.2

SSP    30

SDA    3.3.3.3      (implicit)

SDP    40

SPR    100

Forward Association (FA)

SSA    3.3.3.3      (implicit)

SSP    50          (session source port assigned by AIPR 2  714)

SDA    4.4.4.4      (next node address - AIPR 4  722)

SDP    60          (session destination port assigned by AIPR 2  714)

SPR    100

Flag = Intermediate Waypoint AIPR

Session Y

RA

FA

Flag

Session Z

RA

FA

Flag

*FIG. 10*

AIPR 4    722

Session X

Return Association (RA)

SSA   3.3.3.3

SSP   50

SDA   4.4.4.4      (implicit)

SDP   60

SPR   100

Forward Association (FA)

SSA   1.1.1.1      (original source address from metadata)

SSP   10          (original source port from metadata)

SDA   5.5.5.5      (original destination address from metadata)

SDP   20          (original destination port from metadata)

SPR   100

Flag = Final Waypoint AIPR

Session Y

RA

FA

Flag

Session Z

RA

FA

Flag

*FIG. 11*

LINK STATUS MONITORING BASED ON PACKET LOSS DETECTION

CROSS-REFERENCE TO RELATED APPLICATION(S)

This patent application is related to U.S. patent application Ser. No. 14/497,954 filed Sep. 26, 2014, entitled, "NETWORK PACKET FLOW CONTROLLER," and naming MeLampy, Baj, Kaplan, Kumar, Penfield, and Timmons as inventors, the disclosure of which is incorporated herein, in its entirety, by reference.

This patent application also is related to U.S. patent application Ser. No. 14/562,917, filed Dec. 8, 2014, entitled, "STATEFUL LOAD BALANCING IN A STATELESS NETWORK," and naming Timmons, Baj, Kaplan, MeLampy, Kumar, and Penfield as inventors, the disclosure of which is incorporated herein, in its entirety, by reference.

This patent application also is related to U.S. patent application Ser. No. 14/715,036, filed May 18, 2015, entitled, "NETWORK DEVICE AND METHOD FOR PROCESSING A SESSION USING A PACKET SIGNATURE," and naming Kumar, Timmons, and MeLampy as inventors, the disclosure of which is incorporated herein, in its entirety, by reference.

This patent application also is related to U.S. patent application Ser. No. 14/963,999, filed Dec. 9, 2015, entitled, "ROUTER WITH OPTIMIZED STATISTICAL FUNCTIONALITY," and naming Gosselin, Yungelson, Baj, and MeLampy as inventors, the disclosure of which is incorporated herein, in its entirety, by reference.

This patent application also is related to U.S. patent application Ser. No. 14/833,571, filed Aug. 24, 2015, entitled, "NETWORK PACKET FLOW CONTROLLER WITH EXTENDED SESSION MANAGEMENT," and naming Kaplan, Kumar, Timmons, and MeLampy as inventors, the disclosure of which is incorporated herein, in its entirety, by reference.

This patent application also is related to U.S. patent application Ser. No. 15/054,781, filed Feb. 26, 2016, entitled, "NAME-BASED ROUTING SYSTEM AND METHOD," and naming MeLampy, Baj, Kumar, Penfield, and Timmons as inventors, the disclosure of which is incorporated herein, in its entirety, by reference.

This patent application is also related to U.S. patent application Ser. No. 15/168,712, filed on even date herewith, entitled "DETECTING SOURCE NETWORK ADDRESS TRANSLATION IN A COMMUNICATION SYSTEM," the disclosure of which is incorporated herein, in its entirety, by reference.

This patent application is also related to U.S. patent application Ser. No. 15/169,003, filed on even date herewith, entitled "REVERSE FORWARDING INFORMATION BASE ENFORCEMENT," the disclosure of which is incorporated herein, in its entirety, by reference.

FIELD OF THE INVENTION

The present invention relates to data routing and, more particularly, to packet loss detection and network diagnostics in a communication system.

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

Many people thus analogize packets to a traditional letter using first class mail, where the letter functions as the payload, and the envelope, with its return and mailing addresses, functions as the IP header.

Current Internet devices forward packets one-by-one based essentially on the address of the destination device in the packet header in accordance with an Internet routing protocol such as BGP, OSPFv2, IS-IS, etc. Among other benefits, this routing scheme enables network devices to forward different packets of a single datagram along different routes to reduce network congestion, or avoid malfunctioning network devices.

Those skilled in the art thus refer to IP as a "stateless" protocol because, among other reasons, it does not save packet path data, and does not pre-arrange transmission of packets between end points.

Current Internet routing protocols generally cannot route packets from an element in one private network to an element in another private network because the IP address spaces used for elements in those private networks often overlap. These are often referred to as "unroutable" addresses, which are not useful on the public Internet. Therefore, Network Address Translation (NAT) is often used to convert between local addresses used for routing within the private networks and public Internet addresses used for routing over the public Internet. The public Internet address is used to route packets between the private networks. Within each private network, other information in the packet is used to determine the local address used to route the packet to the destination entity within the destination private network.

Over the past decade, network challenges have evolved from bandwidth and broadband availability to security and mobility. Cloud has emerged as a primary service delivery architecture that achieves economies of scale unheard of in the past. Cloud embraces sharing of resources, including computing and storage. This has created a huge number of new requirements unmet by today's IP routing models, such as:

- Private-network to private-networking models
- Dynamically-arranged, service-specific Quality of Service
- Unified IPv4 and IPv6 routing tables
- Authenticated directional routing
- On-the-fly encryption
- Overlapping address support
- Load balancing instead of equal-cost multipath (ECMP)
- Integrated DPI and resulting flow analytics To meet these requirements, current architectures require middleboxes (e.g., firewalls, DPI devices, load balancers) mixed with overlay networking (e.g., VLANs, nested VLANs, VxLANs, MPLS, Cisco ACI, VMware NSX, Midonet) and orchestration (e.g., OpenStack, service function chaining).

SUMMARY OF VARIOUS EMBODIMENTS

In accordance with one embodiment, a system comprises a source node and a target node. The source node is configured to transmit a series of distinct forward link monitoring protocol messages to the target node, each distinct forward link monitoring protocol message having a metadata portion including a distinct forward sequence number; receive a series of return link monitoring protocol messages from the target node, each return link monitoring protocol message responsive to a distinct forward link monitoring protocol message and having a metadata portion including a forward sequence number from the received forward link monitoring protocol message and a distinct return sequence number; determine if a communication problem occurred based on the forward and reverse sequence numbers in the series of received return link monitoring protocol messages; and when the source node determines that a communication problem occurred, determine whether the communication problem is associated with an outgoing communication link to the target node or an incoming communication link from the target node based on the forward and reverse sequence numbers in the series of received return link monitoring protocol messages. The target node is configured to receive a forward link monitoring protocol message including a distinct forward sequence number, format a return link monitoring protocol message including the distinct forward sequence number and a distinct return sequence number, and transmit the return link monitoring protocol message destined for the source node.

In various alternative embodiments, the forward and return link monitoring protocol messages may be augmented BFD messages. The source node may increment the forward sequence number for each forward link monitoring protocol message it transmits, and the target node may increment the return sequence number for each return link monitoring protocol message it transmits Alternative embodiments include the source node and the target node as well as related methods and computer program products.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with a first waypoint AIPR based on the lead packet processing of FIG. 8, in accordance with one exemplary embodiment.

FIG. 10 is a schematic diagram showing session-related data associated with an intermediate waypoint AIPR based on the lead packet processing of FIG. 8, in accordance with one exemplary embodiment.

FIG. 11 is a schematic diagram showing session-related data associated with a final waypoint AIPR based on the lead packet processing of FIG. 8, in accordance with one exemplary embodiment.

DESCRIPTION OF ILLUSTRATIVE EMBODIMENTS

It is common for certain nodes in a communication system (e.g., routers in an Internet Protocol network) to run a link monitoring protocol to monitor communication links to and from adjacent nodes. In exemplary embodiments of the present invention, special metadata is added to link monitoring protocol messages exchanged by pairs of adjacent nodes to allow such nodes to detect communication link failures and determine whether the failure affects an incoming communication link or an outgoing communication link. In certain exemplary embodiments, the true source information can be used in the context of "stateful" routing as discussed below. Various exemplary embodiments are described herein with reference to use of the Bidirectional Forwarding Detection (BFD) protocol described in IETF RFC 5880, which is hereby incorporated herein by reference in its entirety, although it should be noted that the invention is not limited to the use of the BFD protocol; special metadata of the type described herein could be used in conjunction with other types of protocol messages (e.g., "Hello" messages, "Ping" messages, "Keep-Alive" messages, certain routing protocol messages, etc.) for such communication link monitoring.

Networks

Illustrative embodiments preferably are implemented within an otherwise conventional computer network that uses common networking devices and protocols. Among other things, a network includes at least two nodes and at least one communication link between the nodes. Nodes can include computing devices (sometimes referred to as hosts or devices) and routers. Computers can include personal computers, smart phones, television "cable boxes," automatic teller machines (ATMs) and many other types of equipment that include processors and network interfaces. Links can include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
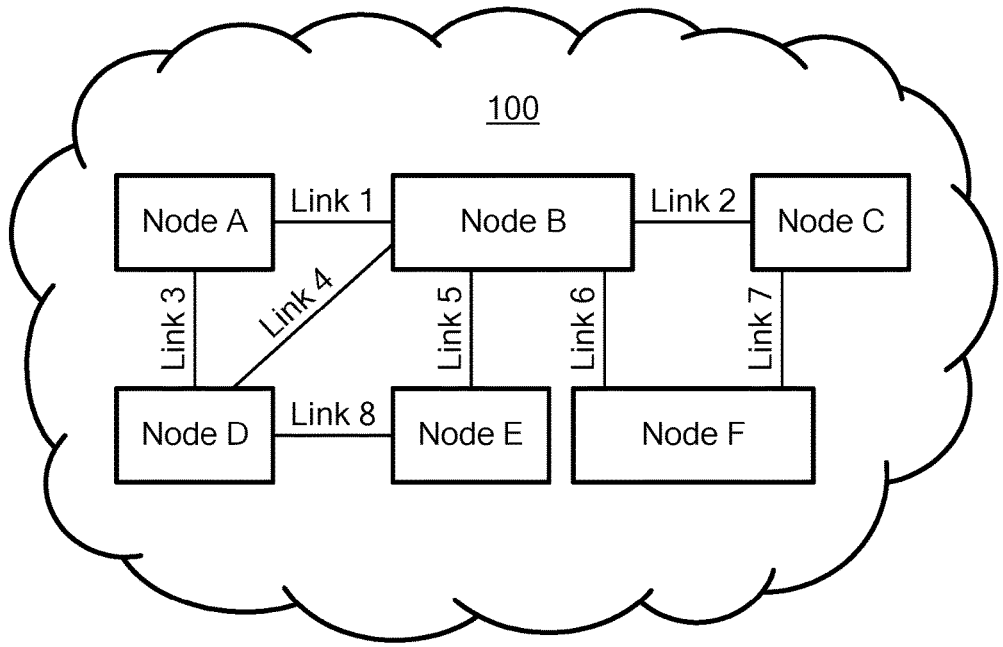
FIG. 1 schematically shows a hypothetical prior art network that may implement certain illustrative embodiments of the invention.

A node can be directly connected to one or more other nodes, each via a distinct communication link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Nodes A-F and all the links 1-8 together make up a network 100. For simplicity, a network is depicted as a cloud or as being enclosed within a cloud. Absence of a cloud, however, does not mean a collection of nodes and links are not a network. For example, a network may be formed by a plurality of smaller networks.

Nodes can initiate communications with other nodes via the network, and nodes can receive communications initiated by other nodes via the network. For example, a node may transmit/forward/send data (a message) to a directly connected (adjacent) node by sending the message via the link that interconnects the adjacent nodes. The message includes the network address of a sending node (the "source address") and the network address of an intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Another commonly used Transport Layer protocol is the User Datagram Protocol (UDP). Each layer performs a logical function and abstracts the layer below it, therefore hiding details of the lower layer. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit source and destination IP addresses, whereas IPv6 utilizes 128-bit source and destination IP addresses. TCP is described generally in IETF RFC 793, which is hereby incorporated herein by reference in its entirety. UDP is described generally in IETF RFC 768, which is hereby incorporated herein by reference in its entirety.

Figure 2:
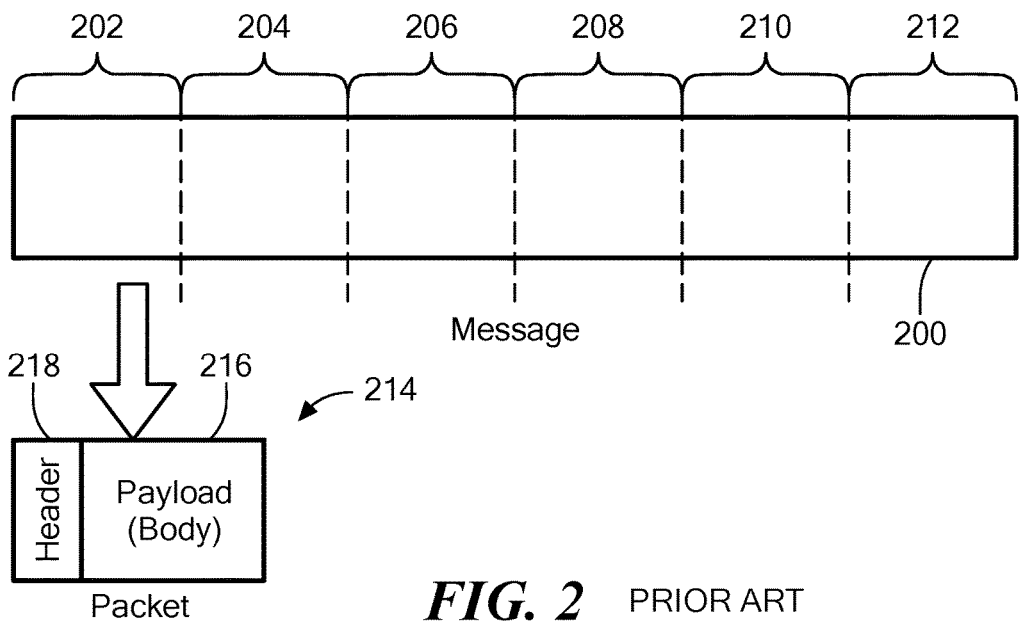
FIG. 2 schematically illustrates a prior art technique for fragmenting a message.

For example, a Layer 3 message may be fragmented into smaller Layer 2 packets if Layer 2 (Data Link Layer) cannot handle the Layer 3 message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol can fragment Layer 4 (Transport Layer) messages into segments, officially referred to as TCP protocol data units (PDUs), if Layer 3 (Network Layer) cannot handle the Layer 4 (Transport Layer) message as one transmission. Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
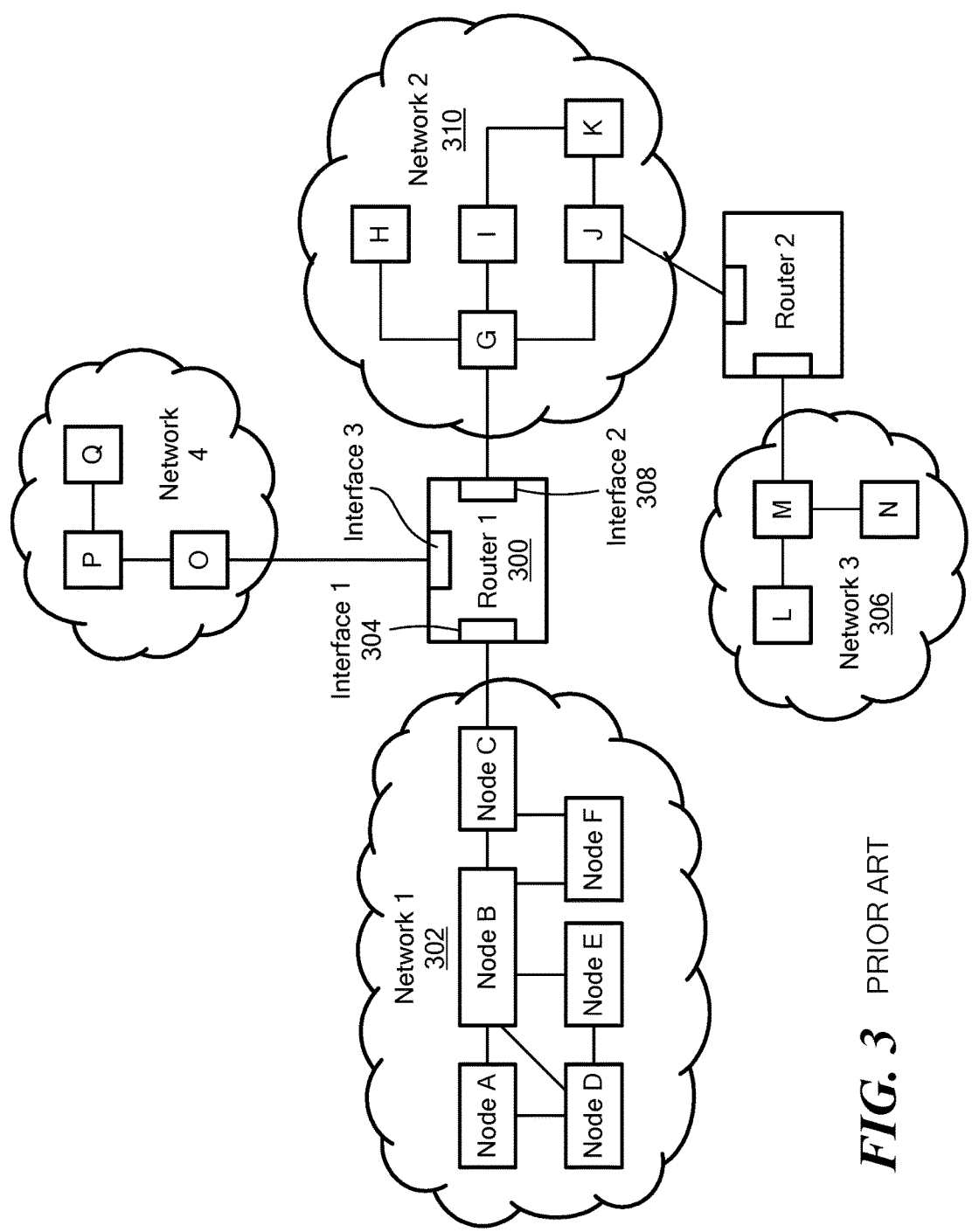
FIG. 3 schematically shows a hypothetical internet that may implement certain illustrative embodiments of the invention.

As depicted schematically in FIG. 3, a router typically acts as a node that interconnects two or more distinct networks or two or more sub-networks (subnets) of a single network, thereby creating a "network of networks" (i.e., an internet). Thus, a router has at least two interfaces; e.g., where each interface connects the router to a different network, as exemplified by Router 1 300 in FIG. 3. Each router also includes a packet router (not shown in FIG. 3 for convenience) that is configured to route packets between the various interfaces based on routing information stored in a routing table. As part of routing packets or otherwise, the packet router is configured to process packets received by the router and to generate packets for transmission by the router.

When a router receives a packet via one interface from one network, it uses information stored in its routing table (sometimes referred to as a "Forwarding Information Base" or "FIB") to direct the packet to another network via another interface, e.g., based on the destination address in the packet, or based on a combination of information in the packet. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, an IP network is considered to be "stateless" because, among other things, it does not maintain this historical information. For example, an IP network generally treats each IP packet as an independent transaction that is unrelated to any previous IP packet. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network. Certain illustrative embodiments, however, may include routers that statefully communicate, as discussed herein.

As noted, when a router receives a packet via one interface from one network, the router uses its routing table to direct the packet to another network. The following is some of the types of information typically found in a basic IP routing table:

Destination: Partial IP address (Expressed as a bit-mask) or Complete IP address of a packet's final destination;

Next hop: IP address to which the packet should be forwarded on its way to the final destination;

Interface: Outgoing network interface to use to forward the packet;

Cost/Metric: Cost of this path, relative to costs of other possible paths;

Routes: Information about subnets, including how to reach subnets that are not directly attached to the router, via one or more hops; default routes to use for certain types of traffic or when information is lacking.

Routing tables may be filled in manually, such as by a system administrator, or dynamically by the router. Routers generally run routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

Additionally, routers also may utilize the Bidirectional Forwarding Detection (BFD) protocol to monitor communication links to adjacent routers. The BFD protocol is described in IETF RFC 5880, which is hereby incorporated herein by reference in its entirety. In many cases, the BFD protocol can detect the failure of a communication link before the routing protocol detects the failure, so, in some situations, the BFD protocol can provide advanced warning to the router that a routing change is needed or is forthcoming.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client computer executing a browser may establish a session with a web server using a conventional process. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes. In some cases, this handshake may be performed to provide a secure session over the Internet using well known protocols such as the Secure Sockets Layer Protocol ("SSL") or the Transport Layer Security Protocol ("TLS").

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Router Architecture

Figure 4:
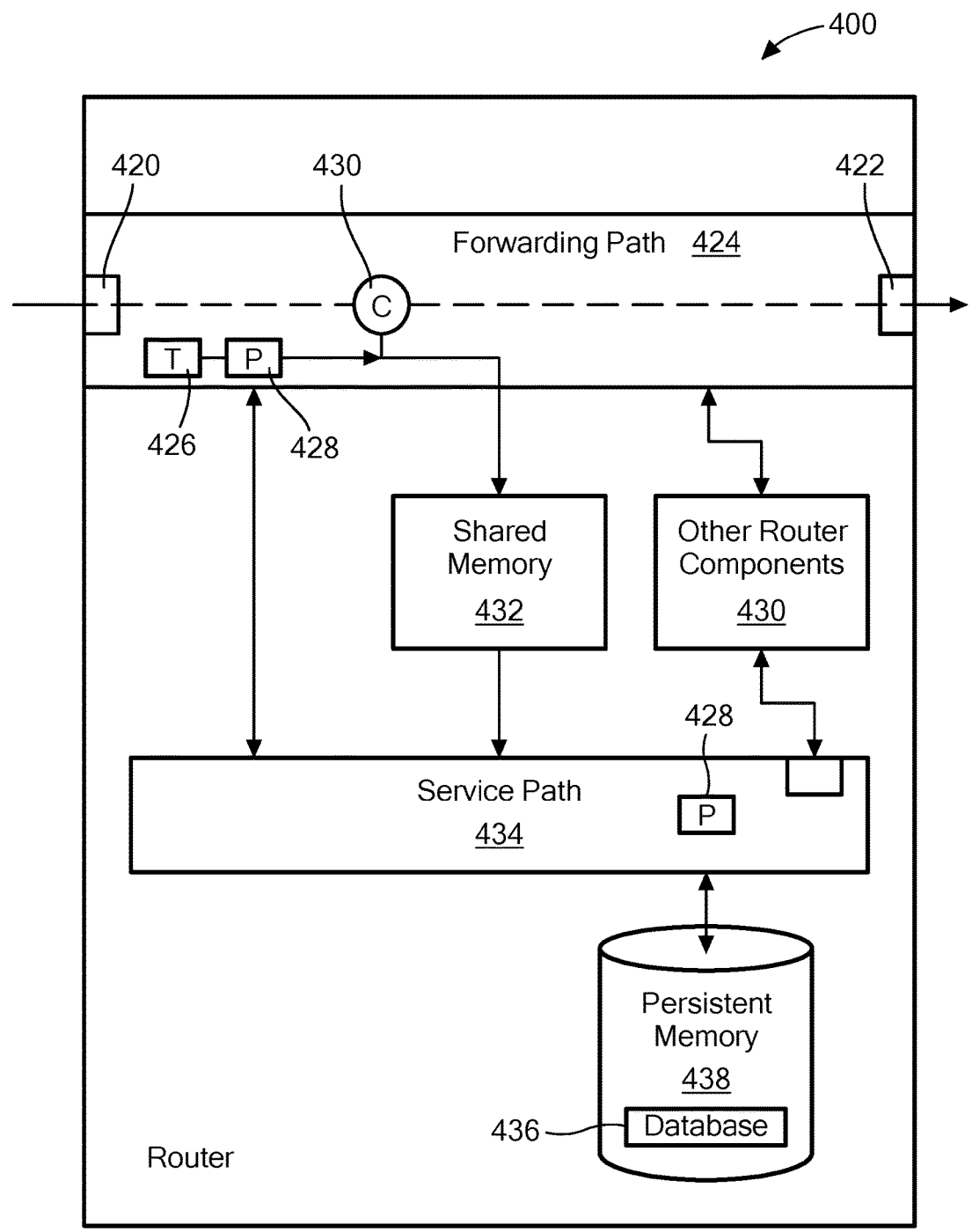
FIG. 4 schematically shows relevant portions of a router including a forwarding path and a service path, in accordance with one exemplary embodiment.

In certain exemplary embodiments (but not necessarily all embodiments), one or more routers may be configured, architecturally, such that the packet router includes two processing pathways or planes, namely a "forwarding path" and a "service path." FIG. 4 schematically shows relevant portions of a router that may be used to implement certain illustrative embodiments of the invention. It should be noted that the router 400 shown in FIG. 4 is a significantly simplified representation of a router used for illustrative purposes. The present invention is not limited to the router architecture shown in FIG. 4 or to any particular router architecture.

Among other things, the router 400 includes a number of interfaces (two are shown in FIG. 4 for convenience, specifically reference number "420" and reference number "422") for receiving packets from other network devices or nodes and/or for forwarding packets to other network devices or nodes. These interfaces are similar to those shown in FIG. 3 and identified as Interfaces 1, 2 and 3. As such, each interface can act as an input or output. For discussion purposes only, however, interface 420 of the router 400 of FIG. 4 is considered an input for receiving packets, while interface 422 is considered an output to forward packets to other network devices. Indeed, those skilled in the art understand that such interfaces can have both input and output functionality.

The router 400 also has a forwarding path 424 that forwards packets through the router 400 from the input interface 420 to the output interface 422. Specifically, as known by those skilled in the art, the forwarding path 424 (also known as a "fast path," "forwarding plane," "critical path," or "data plane") contains the logic for determining how to handle and forward inbound packets received at the input interface 420. Among other things, the forwarding path 424 may include the prior noted routing table (identified in FIG. 4 by reference number "426") and one or more processors/cores (all processors in FIG. 4 are identified by reference number "428") for directing the package through the forwarding fabric of the router 400 to the appropriate output interface 422. To those ends, the forwarding path 424 includes, among other things, logic for (1) decoding the packet header, (2) looking up the destination address of the packet header, (3) analyzing other fields in the packet, and (4) processing data link encapsulation at the output interface 422.

As known by those in the art, the forwarding path 424 may be considered to have a dynamically varying line rate of forwarding packets from the input interface 420 to the output interface 422. Indeed, this line rate is a function of the processing power of the processors 428 within the forwarding path 424, its routing algorithms, and the volume of packets it is forwarding. As noted below, some embodiments may configure the forwarding path 424 to have a minimum line rate that the forwarding path 424 should maintain.

The router 400 also has a service path 434 that is separate from the forwarding path 424. The service path 434 has logic/processing devices 428 configured to perform various processing functions. Among other things, the service path 434 typically runs one or more routing protocols and optionally also the BFD protocol in order to obtain routing and link status information, which it may store in a database 436 within a persistent memory 438 (e.g., a flash drive or hard drive) that can be internal to the router 400 as shown in FIG. 4 or optionally can be external to the router 400. The service path 434 typically also processes packets that cannot be processed completely by the forwarding path, such as, for example, packets that are specifically destined for router 400 or special processing involved with "stateful" routing (e.g., special processing of a first session packet containing special metadata) as discussed below. For example, the forwarding path 424 may redirect certain packets it receives to the service path 434 for special processing. Depending on the type of packet received, the service path 434 may terminate the received packet (e.g., without generating any packet to be transmitted), may create a return packet for the forwarding path 424 to forward back to the source of the received packet (e.g., over the input interface 420), or may create a forward packet for the forwarding path 424 to forward to another device (e.g., over the output interface 422).

The router 400 may have a shared memory 432 (e.g., RAM) and/or other shared router components 440 that permit the forwarding path 424 and the service path 434 to share information and in some embodiments also to communicate directly or indirectly with one another. For example, as discussed above, the forwarding path 424 may redirect packets to the service path 434 for processing, and the service path may generate packets to be forwarded by the forwarding path 424. Also, the forwarding path 424 may have one or more counters 430 that gather statistical information about packets traversing through the forwarding path 424, and these counters 430 may be stored in the shared memory 432 to allow the service path 434 to access the counters 430 for processing and optional storage in a database 436 within a persistent memory 438 (e.g., a flash drive or hard drive) that can be internal to the router 400 as shown in FIG. 4 or optionally can be external to the router 400. One advantage of this architecture is that time-intensive tasks can be offloaded from the forwarding path 424 and instead performed by the service path 434.

Typically, the service path 434 is responsible for managing the routing table 426 (e.g., via a shared memory 432 or via direct or indirect communication) to set up routing information (sometimes referred to herein as "flows") to be used by the forwarding path 424. The routing table 426 may be stored in the shared memory 432 so that it can be accessed as needed by both the forwarding path 424 and the service path 434. Based on information obtained from a routing protocol and/or other protocols, the service path 424 may determine routes and update the routing table 426 with such routes.

Figure 5:
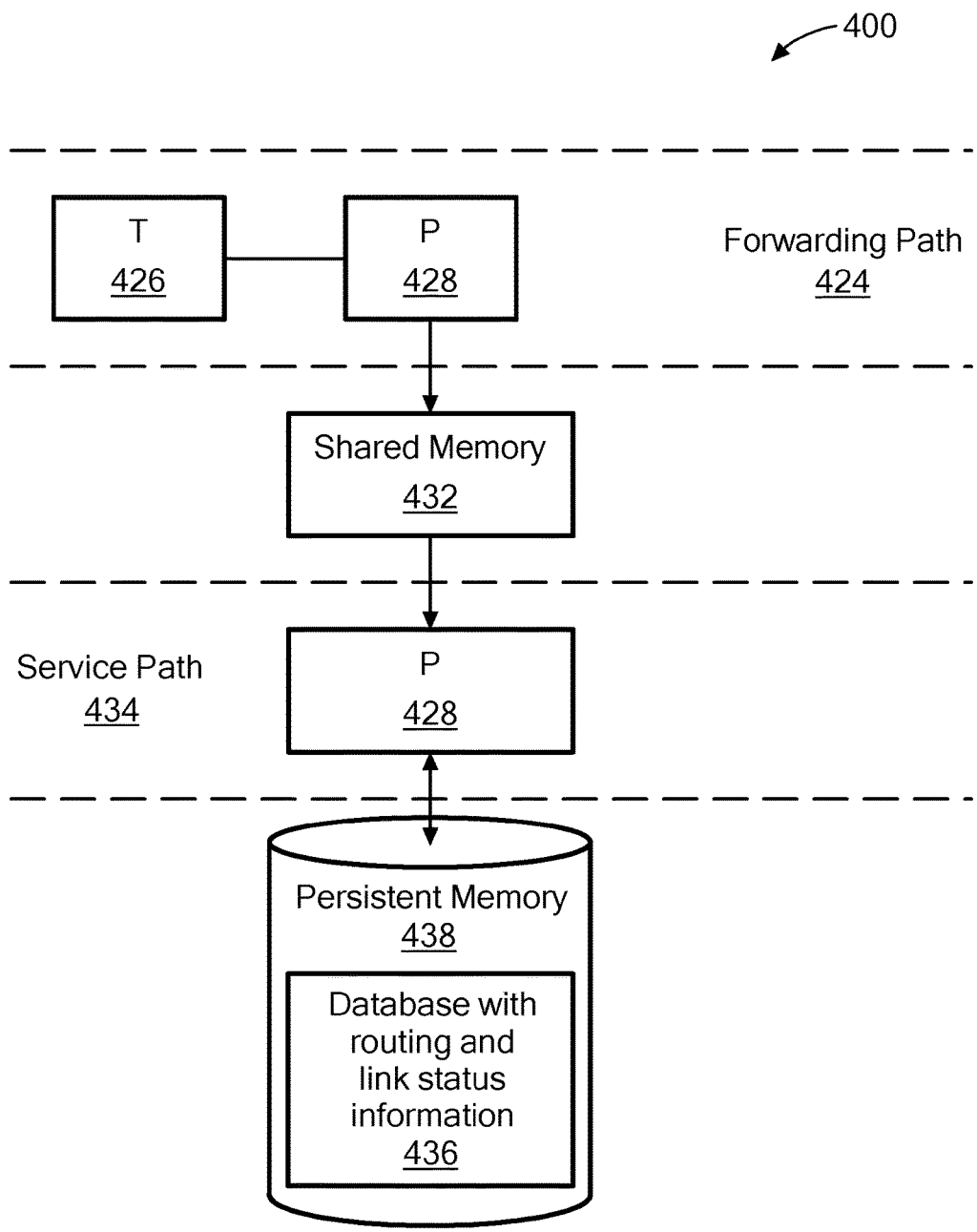
FIG. 5 schematically shows additional details of shared management of a routing table by the forwarding path and the service path of FIG. 4, in accordance with certain illustrative embodiments.

FIG. 5 schematically shows additional details of shared management of the routing table by the forwarding path 424 and the service path 434, in accordance with certain illustrative embodiments.

Routing Flows

Certain exemplary embodiments are described herein with reference to a construct referred to as a "flow." Generally speaking, a flow is a descriptor used internally by the router (e.g., by the forwarding path 424 of certain routers) to process and forward a particular set of packets (e.g., packets having a certain destination address or range of destination addresses, or packets associated with a particular "session" as discussed below with reference to "stateful" routing). In certain exemplary embodiments, a flow is associated with an ingress port on which such packets are expected to be received and an egress port over which such packets are to be forwarded. A flow typically also defines the type(s) of processing to be performed on such packets (e.g., decompress packets, decrypt packets, enqueue packets for forwarding, etc.). When a packet arrives at an interface of a router, the router attempts to find a flow that is associated with the packet (e.g., based on the destination address of the packet, or based on a session with which the packet is associated as discussed below). Generally speaking, if the router locates an active flow for the packet, then the router processes the packet based on the flow, but if the router cannot locate an active flow for the packet, then the router processes the packet (e.g., by the service path 434 of certain routers).

In certain exemplary embodiments, each flow is associated with an "action chain" established for the flow. Each action chain includes a series of functional blocks, with each functional block having a specific function associated with routing packets associated with the session/flow (e.g., decompress packets, decrypt packets, enqueue packets for forwarding, etc.). The action chains associated with different sessions/flows can have different functional blocks depending on the type of processing needed for the session/flow. In routers of the type shown and described with reference to FIG. 4, action chains may be stored in the shared memory 432, thereby allowing the forwarding path 424 to use the action chains and the service path 434 to manipulate the action chains as discussed below.

In certain exemplary embodiments, each action chain has a leading "chain descriptor" that includes two fields:

1. A pointer field containing a pointer to the first functional block in the action chain, and 2. A "valid" field (e.g., one or more bits) that is used to indicate whether the action chain is valid or invalid. Typically, one particular value of the valid field is used to indicate that the action chain is valid and can be used, while another value of the valid field is used to indicate that the action chain is invalid/deactivated.

Figure 6:
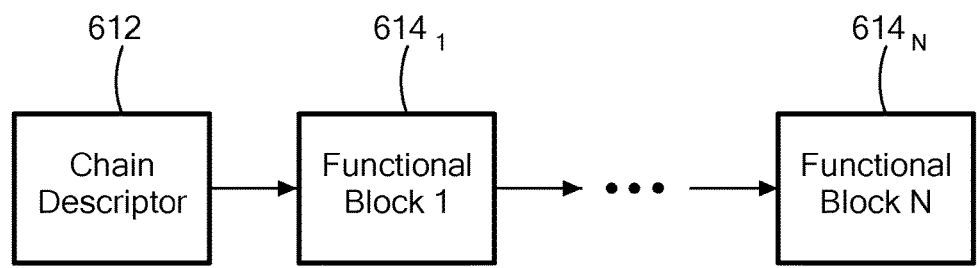
FIG. 6 is a schematic diagram of an action chain used to process and forward packets, in accordance with one exemplary embodiment.

FIG. 6 is a schematic diagram of an action chain, in accordance with one exemplary embodiment. As discussed above, the action chain includes a chain descriptor 612 and a number of functional blocks $614_1$-$614_N$. A packet is processed by first locating the action chain associated with the packet and then executing each functional block in order to effectuate processing/forwarding of the packet.

Stateful Routing

In certain exemplary embodiments, at least some of the routers in the communication system are specially configured to perform "stateful" routing on packets associated with a given session between a source node and destination node, as discussed herein. For convenience, such routers are referred to above and below as Augmented IP Routers (AIPRs) or waypoint routers. AIPRs and stateful routing also are discussed in related incorporated patent applications, which are incorporated by reference above. For convenience, packets being routed from the source node toward the destination node may be referred to herein as "forward" packets or the "forward" direction or path, and packets being routed from the destination node toward the source node may be referred to herein as "reverse" or "backward" or "return" packets or the "reverse" or "backward" or "reverse" direction or path.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible.

The AIPRs through which the lead packet passes insert special metadata into the lead packet and optionally also into return packets as needed to allow each AIPR on the path to determine whether there is a prior AIPR on the path and whether there is a next hop AIPR on the path. In order to force session packets to traverse the same set of AIPRs, each successive AIPR typically changes the destination address field in each session packet to be the address of the next hop AIPR and changes the source address field in each session packet to be its own network address. The last AIPR prior to the destination node then typically will change the source and destination address fields back to the original source and destination addresses used by the source node. In this way, session packets can be forwarded, hop by hop, from the source node through the set of AIPRs to the destination node, and vice versa.

Figure 7:
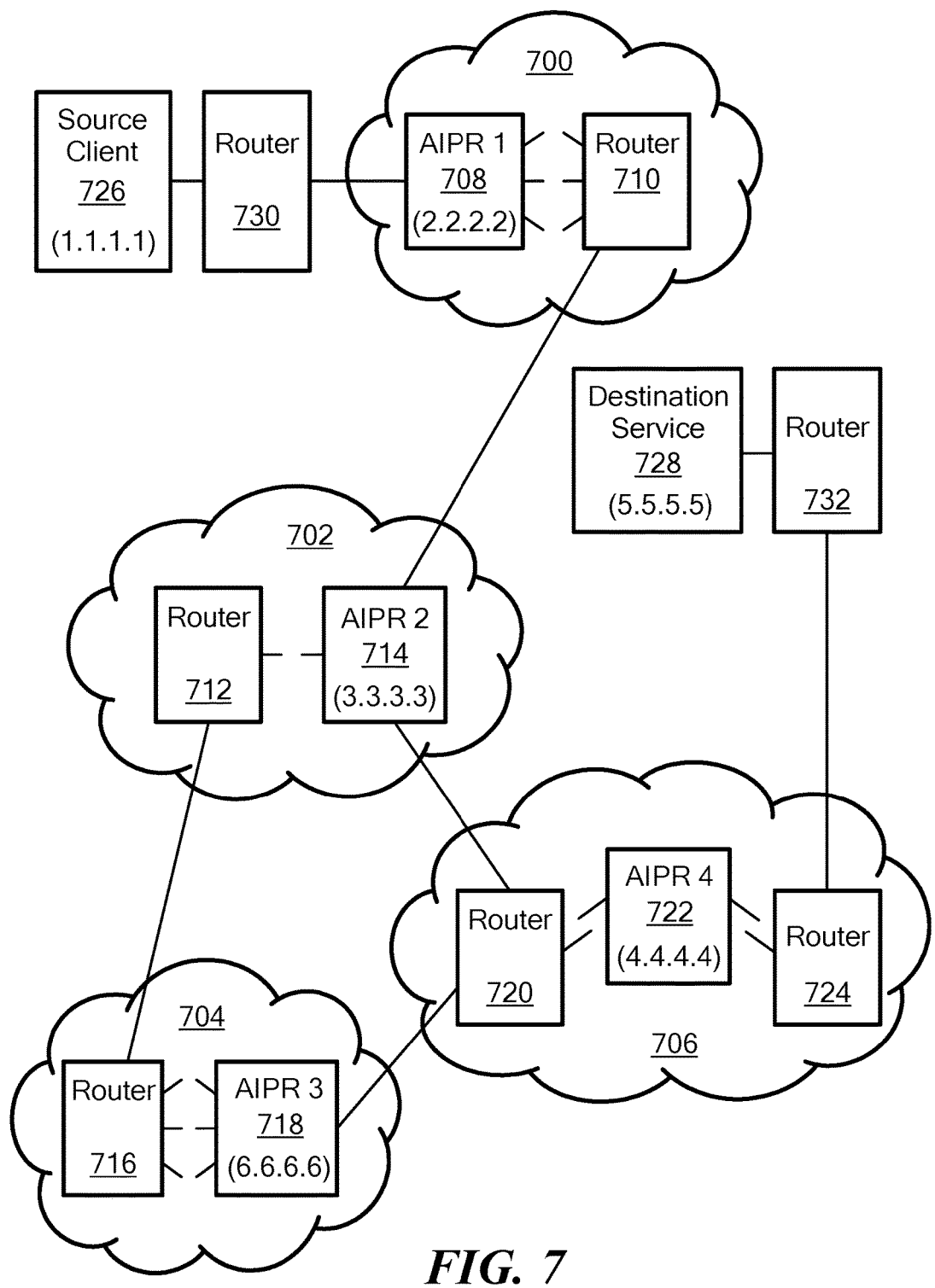
FIG. 7 schematically shows a hypothetical internet that includes conventional routers and augmented IP routers (AIPRs).

Certain aspects of one exemplary stateful routing embodiment are now described with reference to FIGS. 7-15. FIG. 7 schematically shows a hypothetical internet that includes conventional routers and AIPRs, according to one exemplary embodiment of the present invention. Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that the present invention is not limited to the network shown in FIG. 7 or to any particular network.

Figure 8:
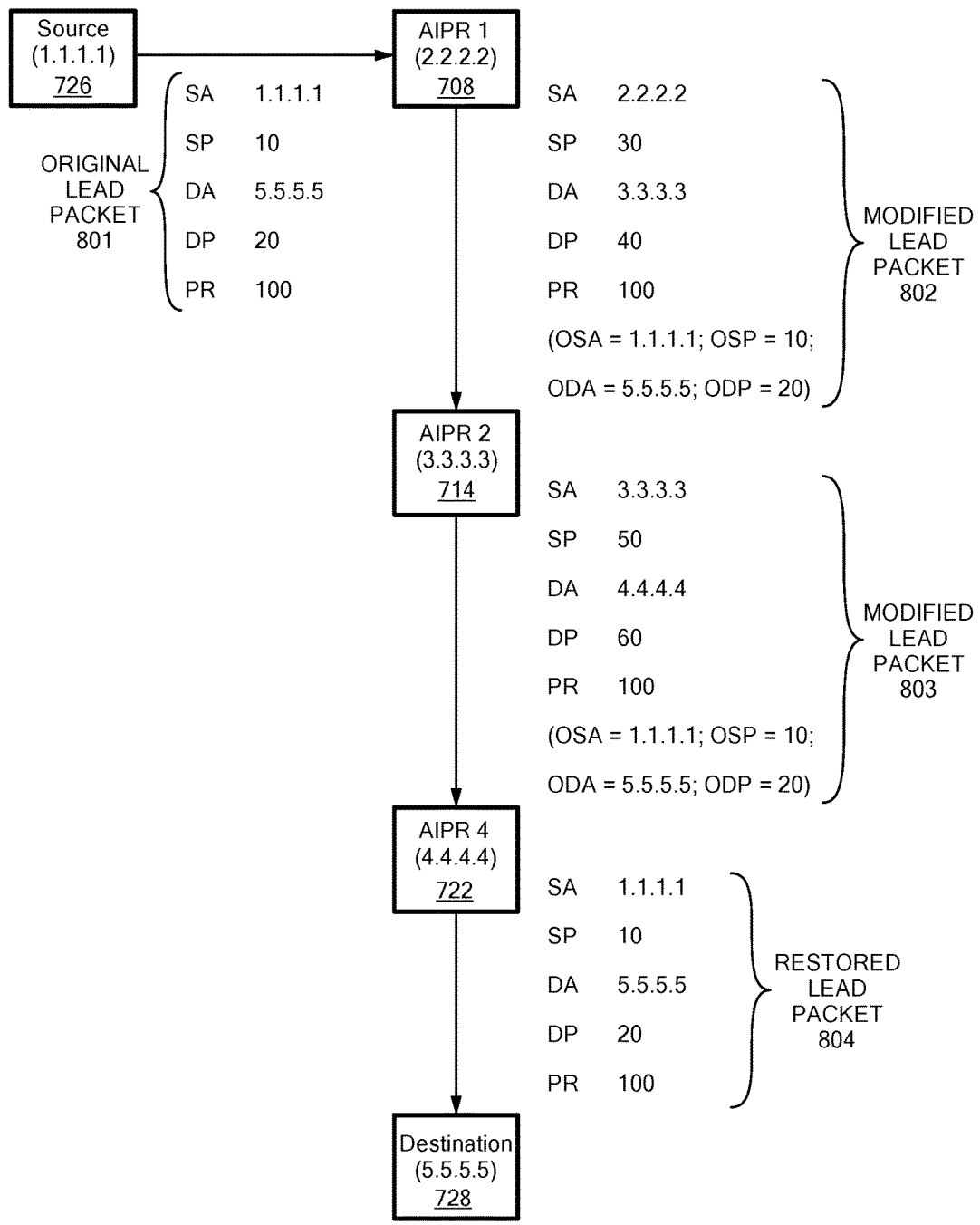
FIG. 8 schematically shows an example of lead packet processing from a source node to a destination node for stateful routing, in accordance with one exemplary embodiment.
Figure 12:
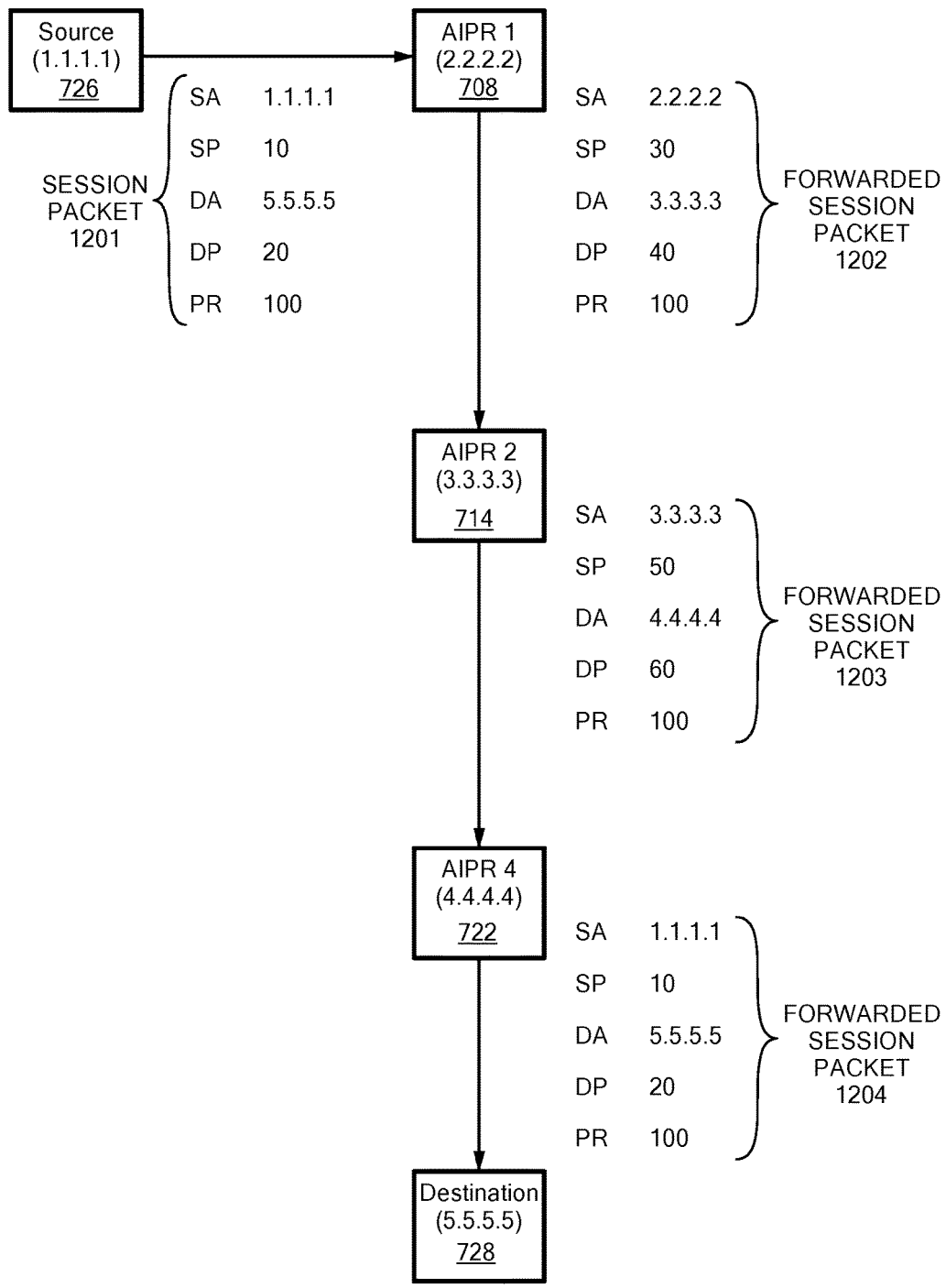
FIG. 12 is a schematic diagram providing an example of session packet processing for an example packet sent from the source device to the destination device through the AIPR devices for the session established in FIG. 8, in accordance with one exemplary embodiment.
Figure 13:
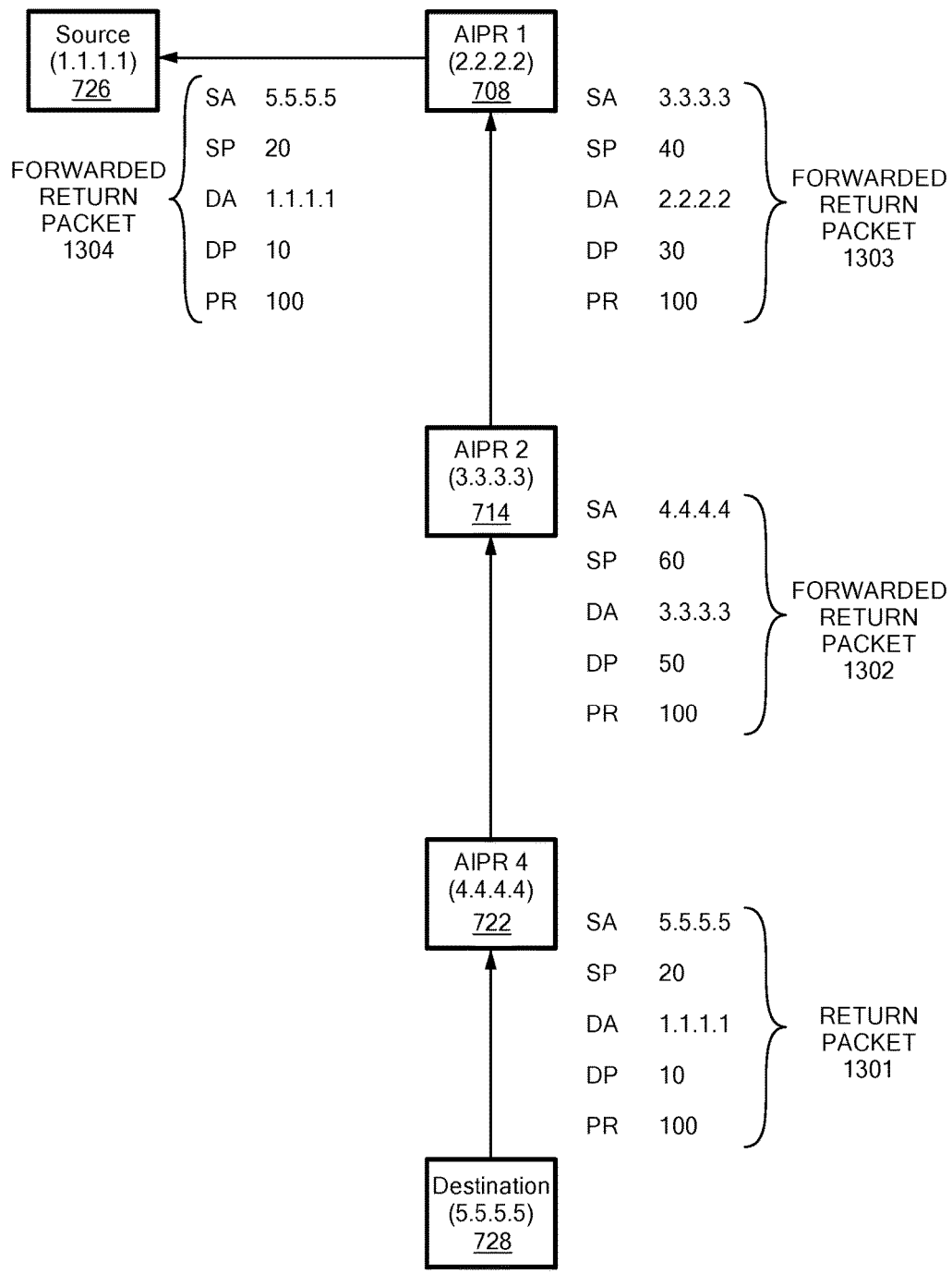
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with certain illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing interface for a particular destination network address, but also the next waypoint AIPR (if any) to use for that destination network address. In this example, the nodes communicate using TCP/IP-based messages, and the metadata inserted into the lead packet may be conveyed, for example, as a TCP Option field or added to the TCP packet as payload data. In various alternative embodiments, the nodes may communicate using other protocols, and the method in which the metadata is conveyed in the lead packet would be protocol-specific.

As noted above, in stateful routing, all forward packets associated with a particular session are made to follow the same path through a given set of AIPRs on their way from the source client node 726 to the destination service node 728. In a similar manner, all return packets associated with the session typically, but not necessarily, are made to traverse the same set of AIPRs in reverse order on their way from the destination service node 728 to the source client node 726 (which may be referred herein to as "bi-flow").

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example, for a TCP/IP-based session, AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

To force the lead packet to reach next waypoint AIPR 2 714 (as opposed to being randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values. Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing interface. In certain exemplary embodiments, AIPR 1 708 may establish a flow that associates the session with the incoming interface over which the lead packet 801 was received and the outgoing interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714.

AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path. AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing interface.

To force the modified lead packet 803 to reach AIPR 4 722 (as opposed to being randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing interface. In certain exemplary embodiments, AIPR 2 714 may establish a flow that associates the session with the incoming interface over which the modified lead packet 802 was received and the outgoing interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet (i.e., Modified Lead Packet 804) over an outgoing interface, AIPR 4 722 accesses its routing information base to look up routing information based on the original destination address of 5.5.5.5 (e.g., outgoing interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing interface. In certain exemplary embodiments, AIPR 4 722 may establish a flow that associates the session with the incoming interface over which the lead packet 803 was received and the outgoing interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

It should be noted that each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726 and the destination service node 728 to establish an end-to-end communication session between the source client node 726 and the destination service node 728.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11. Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, randomly).

Figure 14:
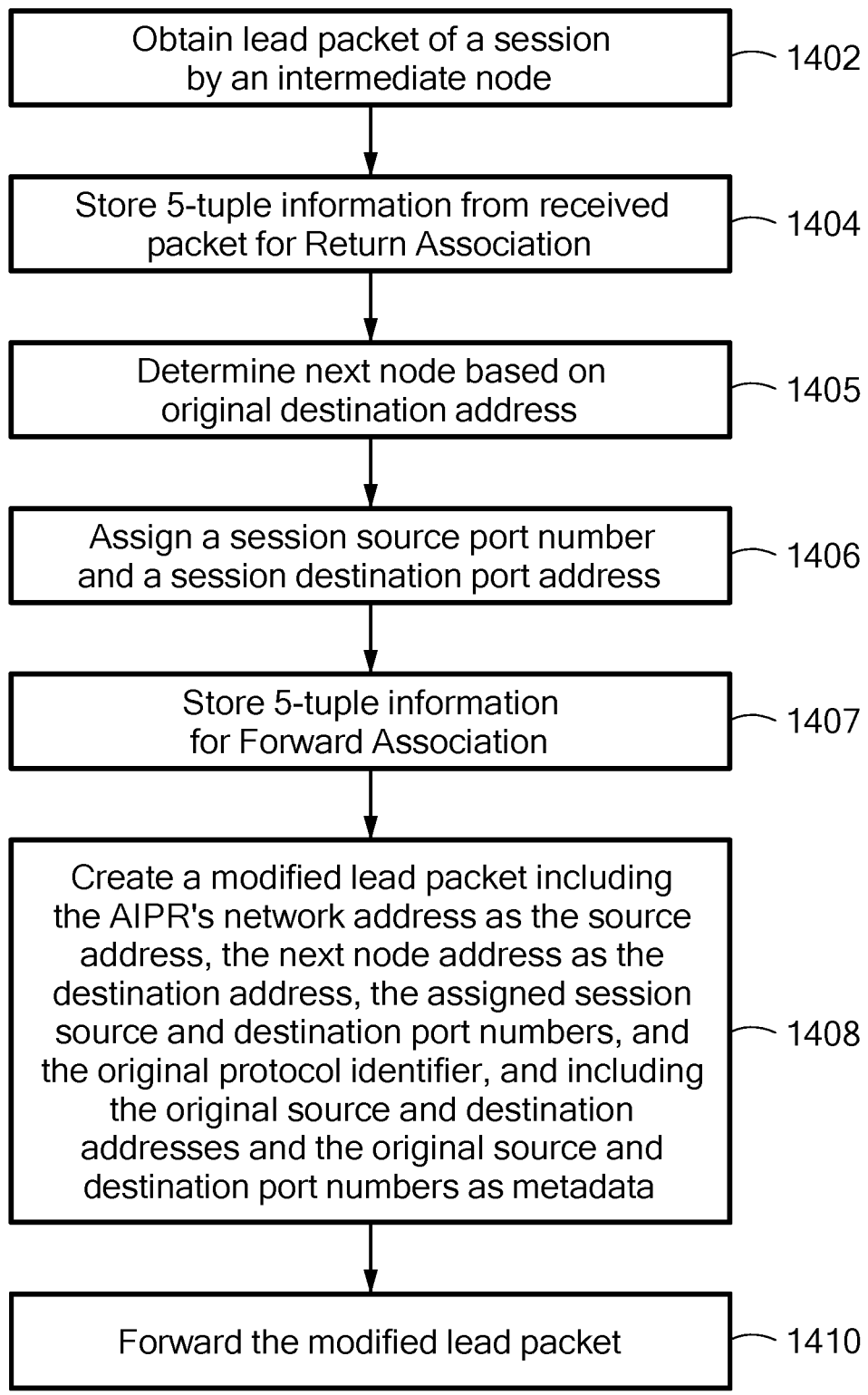
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next waypoint AIPR based on the original destination address. This typically involves accessing the AIPR's routing information base from which the AIPR can determine the outgoing port and next waypoint AIPR (if any) for the original destination address.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
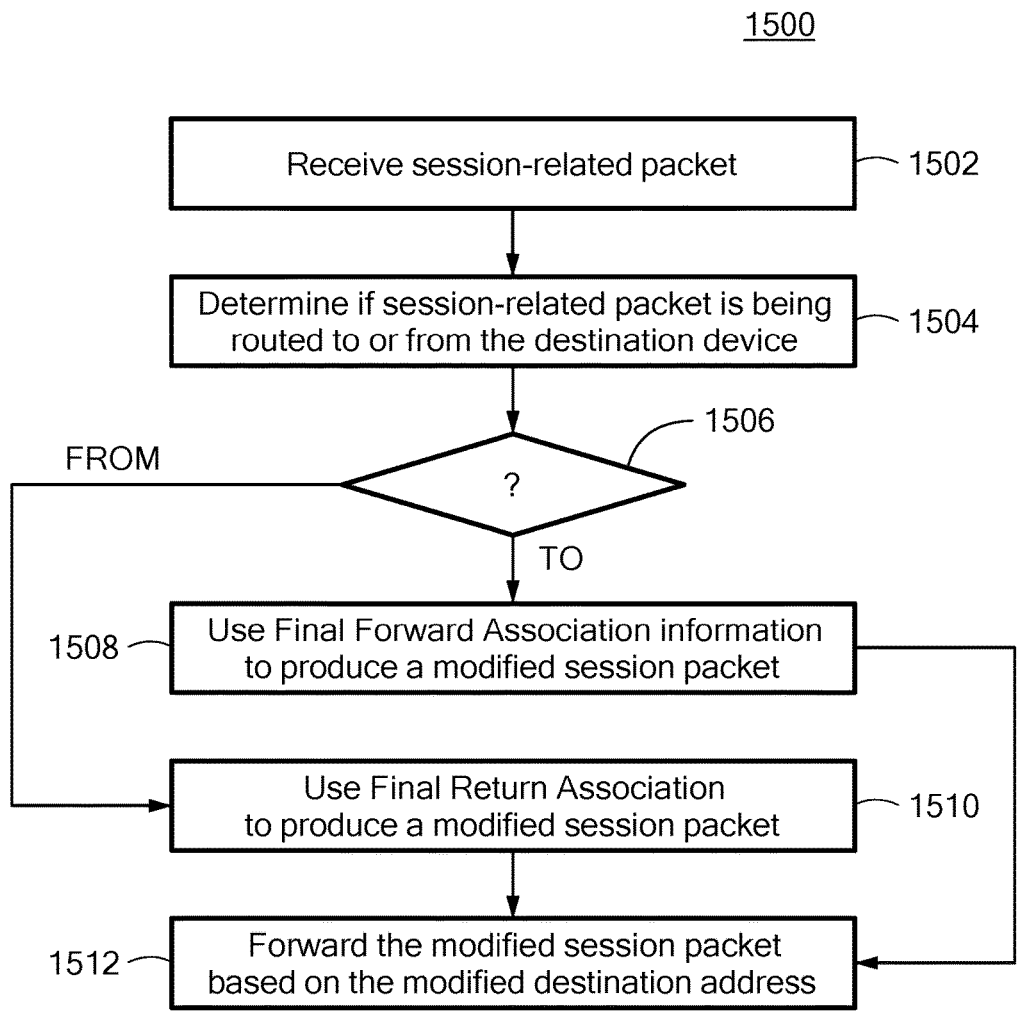
FIG. 15 is a flowchart schematically illustrating some session packet processing operations performed by an AIPR, in accordance with one exemplary embodiment.

FIG. 15 is a flowchart 1500 schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

| | |
|---|---|
| SA | 2.2.2.2 |
| SP | 10 |
| DA | 5.5.5.5 |
| DP | 20 |
| PR | 100 |
| SSP | 30 (session source port number assigned by AIPR 1 708) |
| SDP | 40 (session destination port number assigned by AIPR 1 708) |

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

| | |
|---|---|
| SA | 3.3.3.3 |
| SP | 10 |
| DA | 5.5.5.5 |
| DP | 20 |
| PR | 100 |
| SSP | 50 (session source port number assigned by AIPR 2 714) |
| SDP | 60 (session destination port number assigned by AIPR 2 714) |

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

| | |
|---|---|
| SA | 4.4.4.4 |
| SP | 10 |
| DA | 5.5.5.5 |
| DP | 20 |
| PR | 100 |
| SSP | 70 (session source port number assigned by AIPR 4 722) |
| SDP | 80 (session destination port number assigned by AIPR 4 722) |

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 in order to establish an end-to-end communication session between the source client node 726 and the destination service node 728.

Lead Packet Identification

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 16:
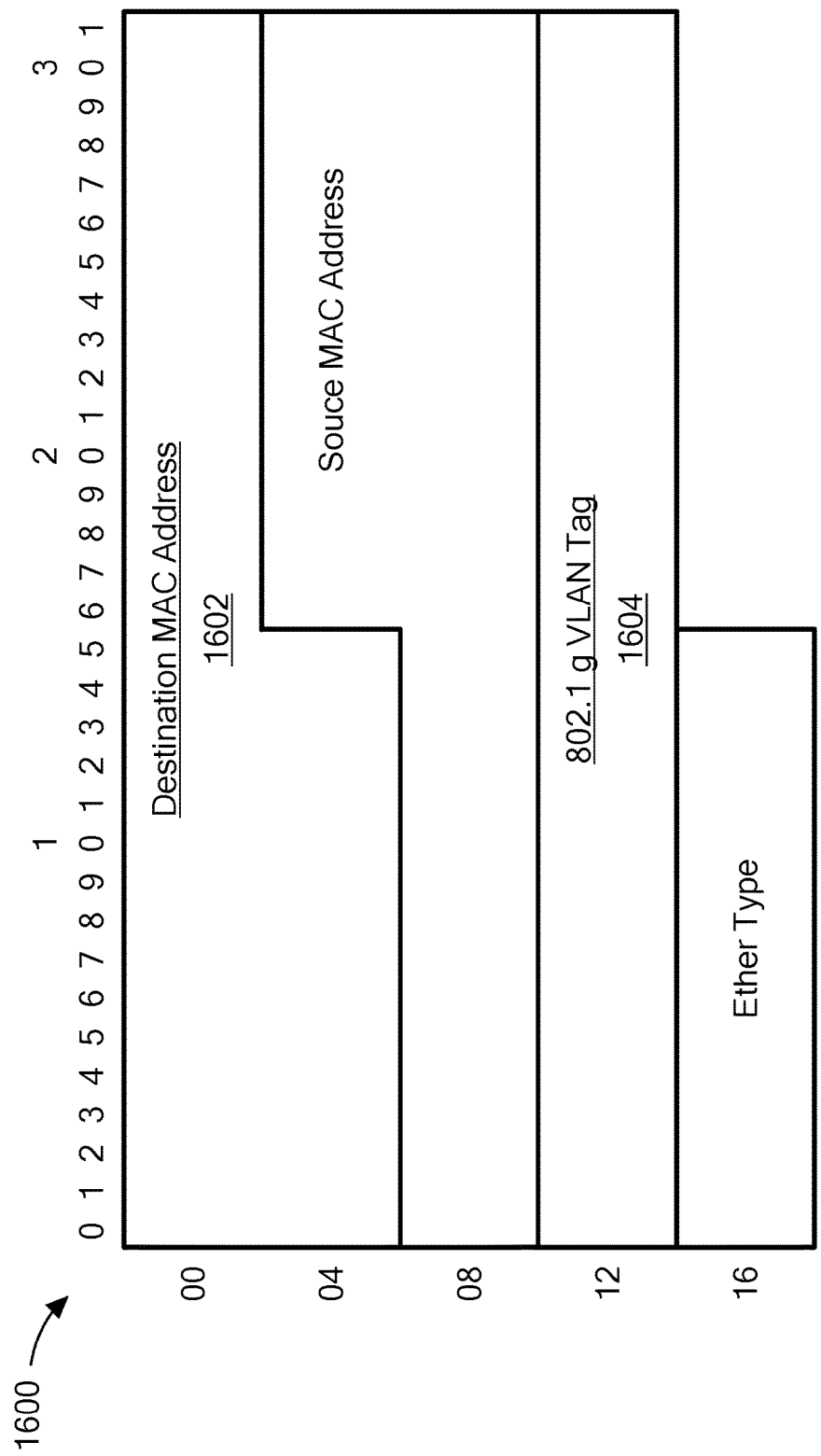
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
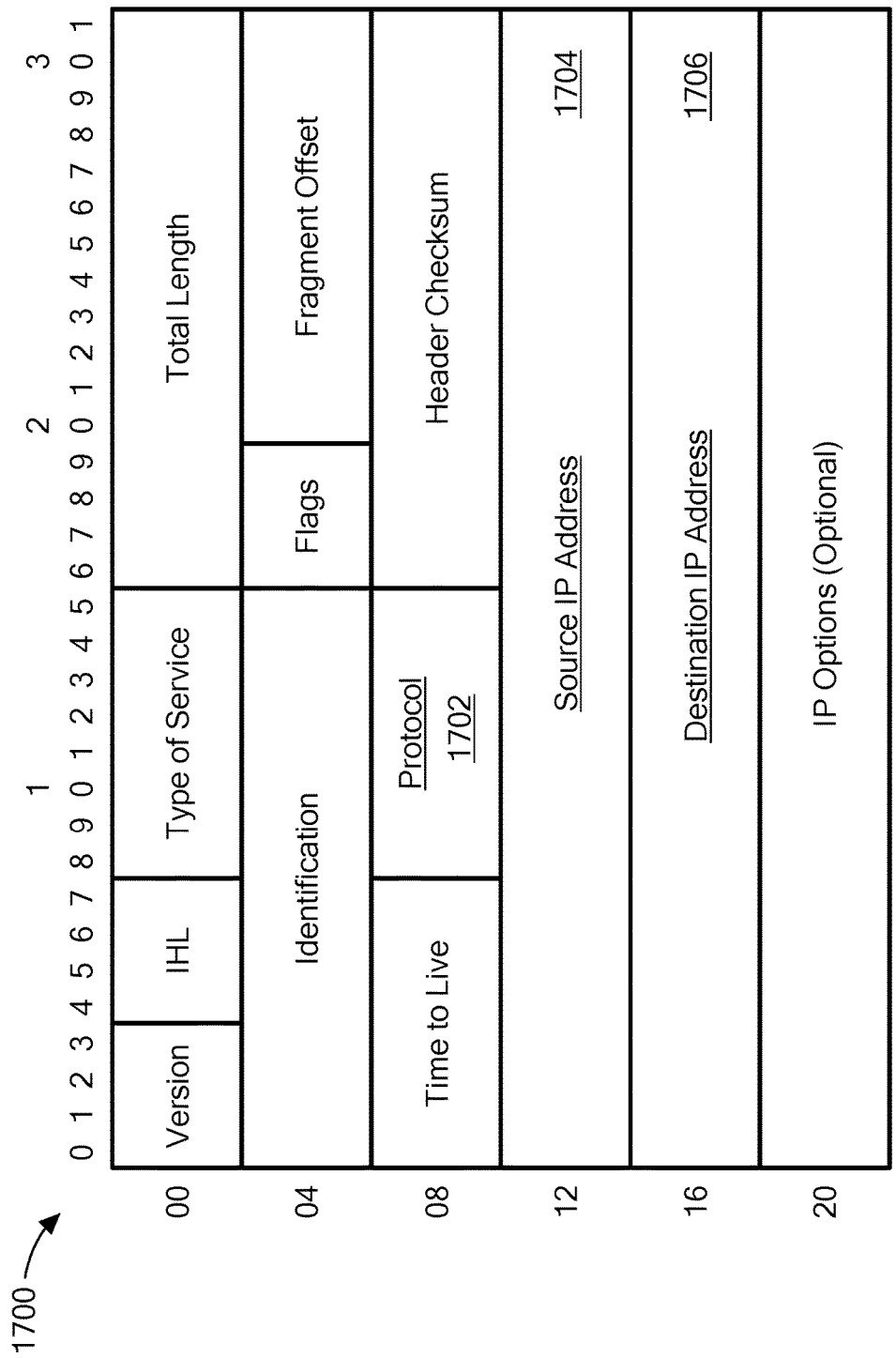
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
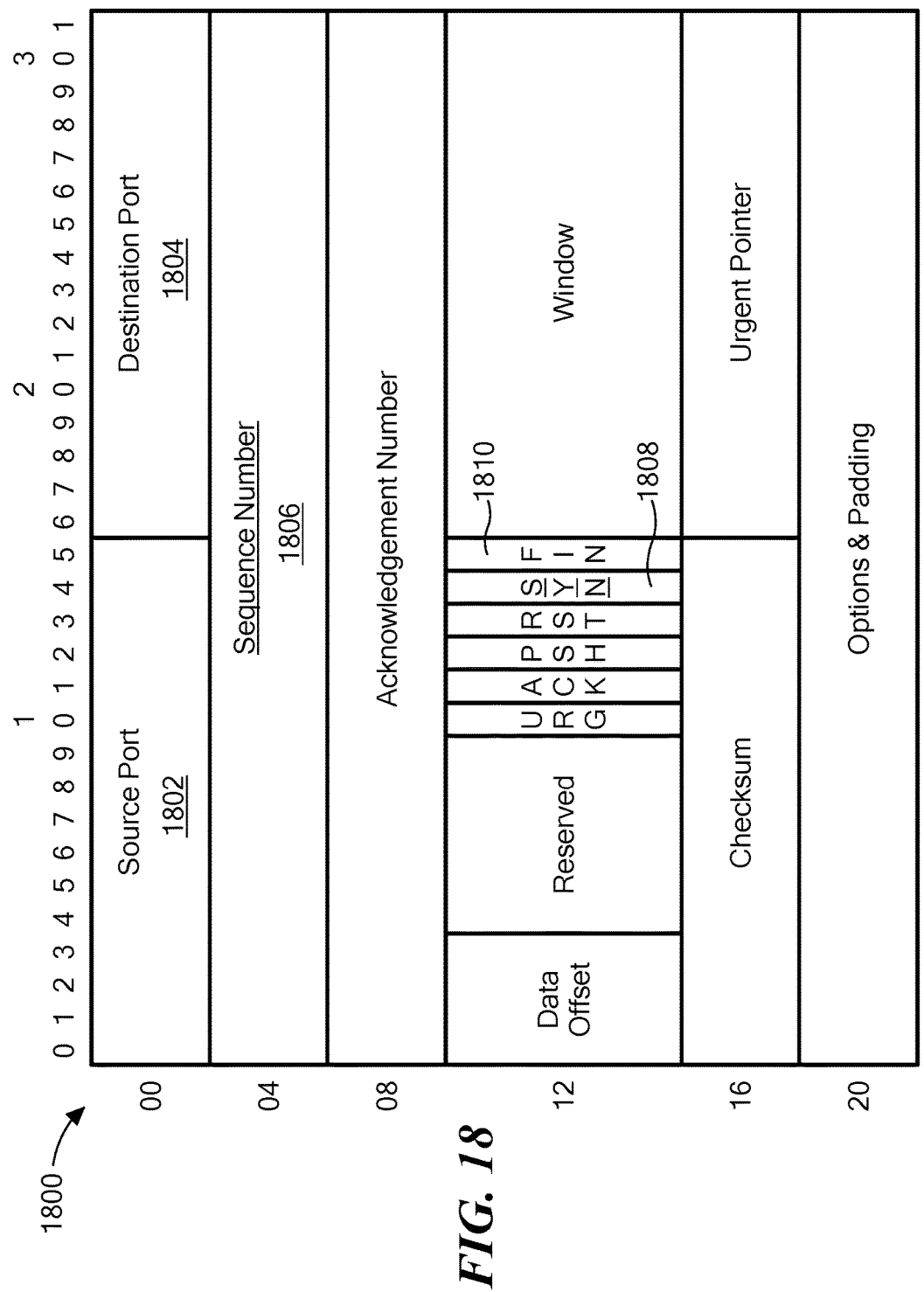
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

| Data Item | Where From | Description |
| --- | --- | --- |
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Augmented IP Router (AIPR)

Figure 19:
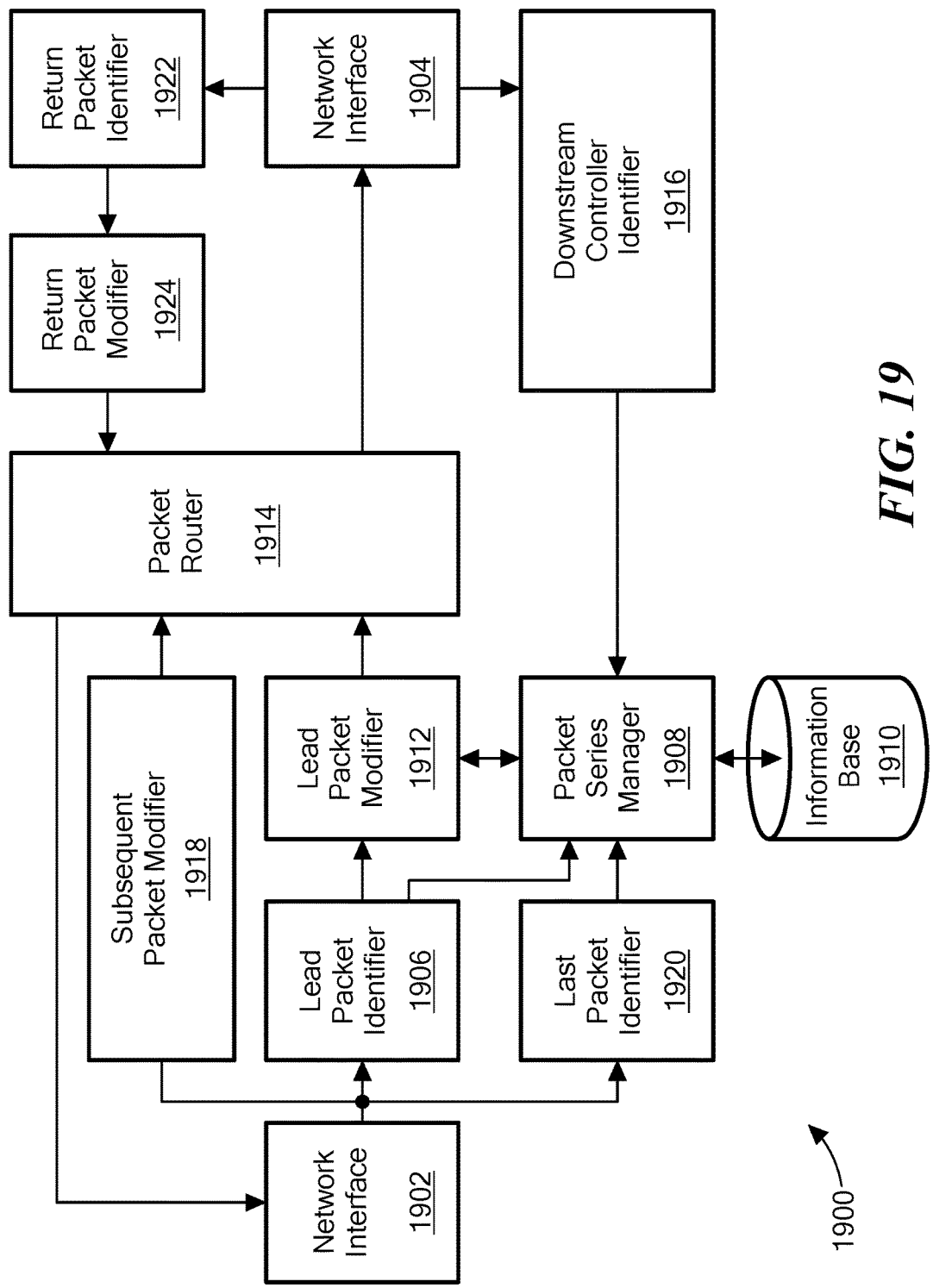
FIG. 19 schematically shows a block diagram of an AIPR of FIG. 7, in accordance with one exemplary embodiment.

FIG. 19 is a schematic block diagram of an AIPR (waypoint) 1900 configured in accordance with illustrative embodiments of the invention. The AIPR 1900 includes at least two network interfaces 1902 and 1904, through which the AIPR 1900 may be coupled to two networks. The interfaces 1902 and 1904 may be, for example, Ethernet interfaces. The AIPR 1900 may send and receive packets via the interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the interface 1902, in combination with a first port number assigned by the session manager 1908 for receiving subsequent packets of this session. The unique identifier may further include the network address of the AIPR 1900 or of the other interface 1904, in combination with a second port number assigned by the session manager 1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
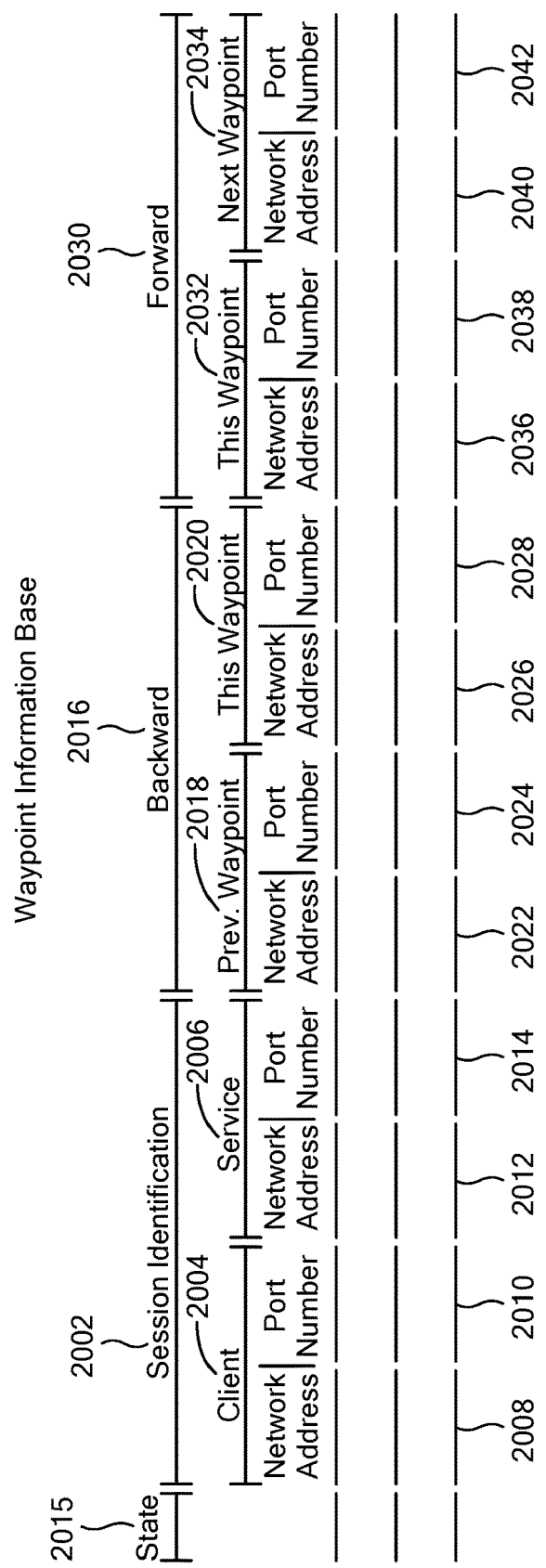
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below.

Some embodiments of the waypoint information base 2000 may include the forward information 2030 without the backward information 2016. Other embodiments of the waypoint information base 2000 may include the backward information 2016 without the forward information 2030. Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
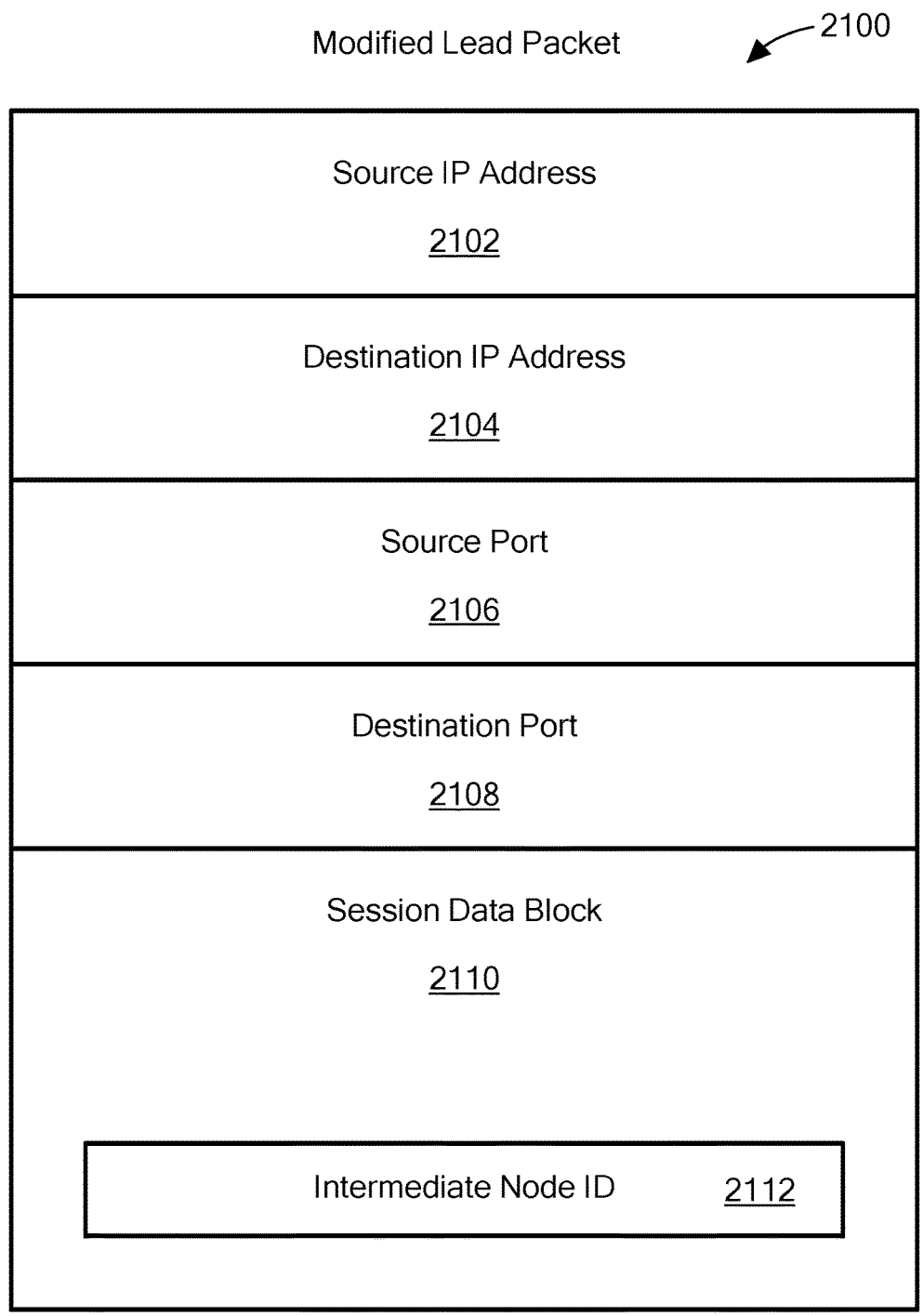
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet router 1914, via the second network interface 1904. The modified lead packet is naturally routed, unless the AIPR 1900 has been provisioned with forward path information.

Eventually, the destination service sends a return packet. The AIPR 1900 receives the return packet via the second interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000. The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet router 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

Figure 22:
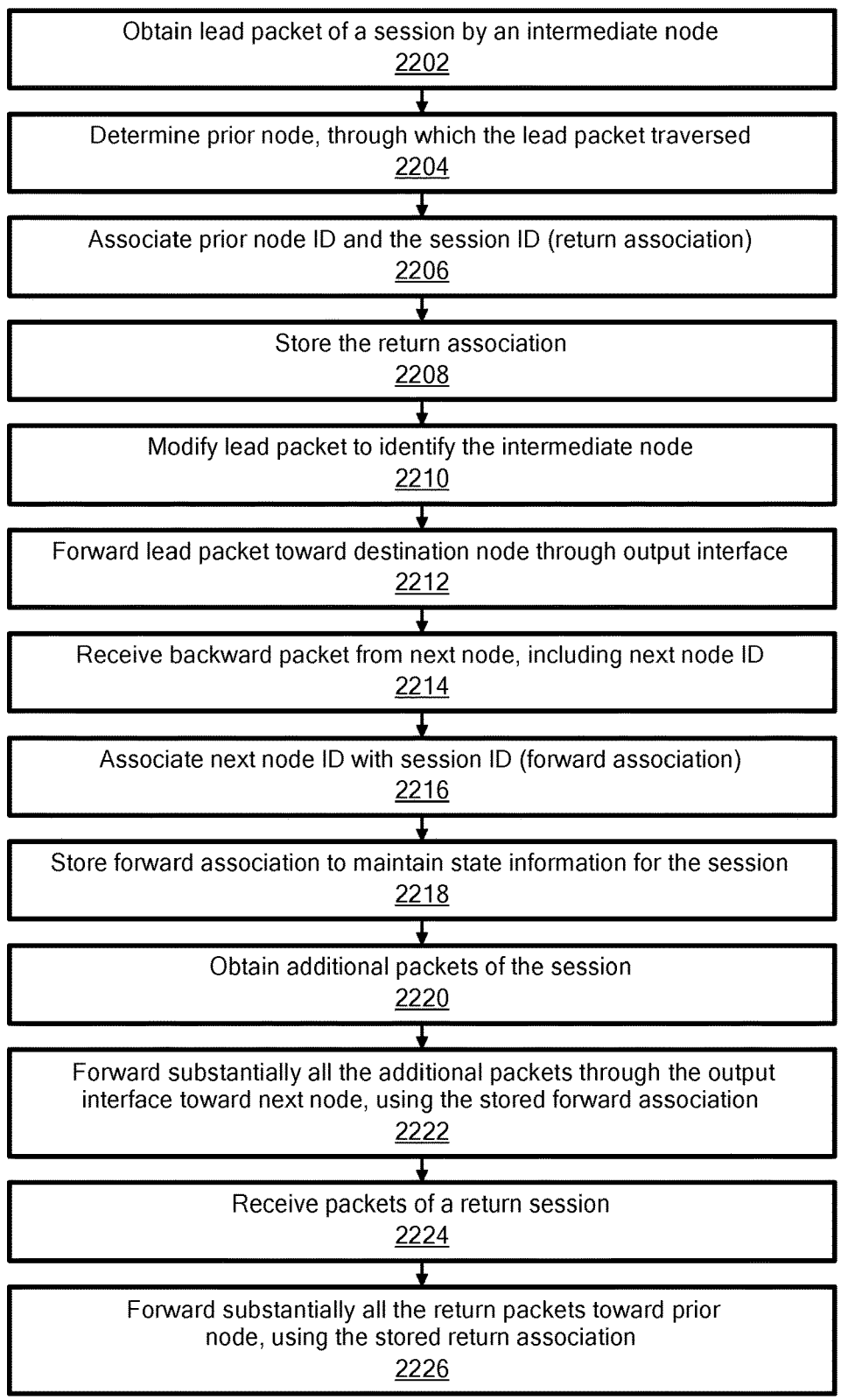
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output interface to the IP network. The next hop node may be determined any number of ways. The electronic output interface is in communication with the IP network. At 2214, a backward message (e.g., a packet, referred to as a "backward packet") is received through an electronic input interface of the intermediate node. The backward message is received from a next node having a next node identifier. The backward message includes the next node identifier and the session identifier. The electronic input interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output interface.

Figure 23:
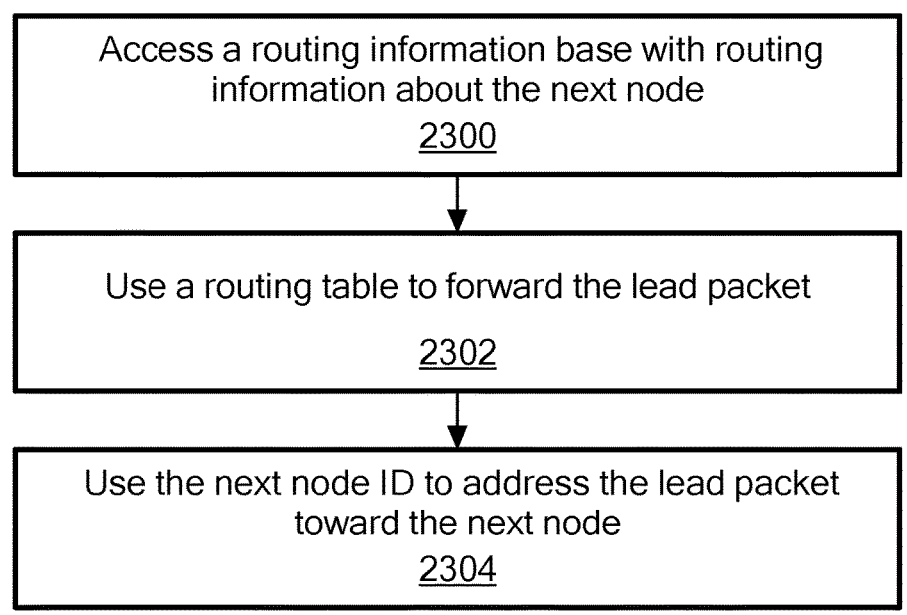
FIG. 23 is a flowchart illustrating some of the operations involved with forwarding a lead packet as part of the process of FIG. 22, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In a manner similar to other components discussed above, the AIPR 1900 and all or a portion of its components 1902-1924 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Link Status Monitoring Based on Packet Loss Detection

As discussed above, it is common for certain nodes in a communication system (e.g., AIPRs) to run a link monitoring protocol to monitor communication links to and from adjacent nodes. In exemplary embodiments of the present invention, special metadata is added to link monitoring protocol messages exchanged by pairs of adjacent nodes to allow such nodes to detect communication link failures and determine whether a failure affects an incoming communication link or an outgoing communication link.

Specifically, two nodes exchange link monitoring protocol messages including special metadata (discussed in more detail below) that allows a node to determine the status of both the incoming communication link and the outgoing communication link between the two nodes. In the event one or both communication links include a source NAT device, the special metadata passes unchanged through the source NAT device and therefore allows for such link status monitoring even in the presence of source NAT. In certain exemplary embodiments, link status information can be used in the context of "stateful" routing, as discussed herein.

Various exemplary embodiments are described herein with reference to use of the Bidirectional Forwarding Detection (BFD) protocol described in IETF RFC 5880, which is hereby incorporated herein by reference in its entirety. Specifically, a sending node transmits BFD packets including special metadata that allows a node to perform link status monitoring based on packet loss detection. For convenience, this use of the BFD protocol with added metadata may be referred to herein as "augmented BFD." In certain exemplary embodiments, link status information can be used in the context of "stateful" routing, as discussed herein. It should be noted, however, that the invention is not limited to such use of the BFD protocol. Rather, special metadata of the type described herein could be used in conjunction with other types of protocol messages (e.g., "Hello" messages, "Ping" messages, "Keep-Alive" messages, certain routing protocol messages, etc.) to perform link status monitoring based on packet loss detection as discussed herein.

BFD packets have a Mandatory Section and an optional Authentication Section. The Mandatory Section of a BFD Control packet has the format shown in Section 4 of IETF RFC 5880 which was incorporated by reference above.

The optional Authentication Section has the format shown in Section 4 of IETF RFC 5880 which was incorporated by reference above.

The format of the Authentication Section, if present, is dependent on the type of authentication in use.

BFD packets are transmitted in an encapsulation appropriate to the environment. For example, in certain exemplary embodiments, BFD packets are encapsulated or carried in Internet Protocol (IP) datagrams and may be further encapsulated within a transport layer protocol segments, such as User Datagram Protocol (UDP) segments, within IP datagrams. Transport layer segments are essentially used to carry information from a particular application in a source device to the corresponding application in a destination device, whereas the IP datagram itself is essentially used as an envelope to carry the transport layer segment and its payload from the source device to the destination device.

There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit addresses, whereas IPv6 utilizes 128 bit addresses. In addition, IPv6 can support larger datagram sizes.

IPv4 datagrams have the general header format shown in Section 3.1 of IETF RFC 791 which was incorporated by reference above.

IPv6 datagrams have the general header format shown in Section 3 of IETF RFC 2460 which was incorporated by reference above.

Thus, an IP datagram that encapsulates or carries a BFD packet will have an IP header including, among other things, a source address field and a destination address field.

UDP is described generally in IETF RFC 768, which is hereby incorporated herein by reference in its entirety. The general format of a UDP segment is shown in IETF RFC 768 which was incorporated by reference above.

Thus, an IP datagram with a UDP segment that encapsulates or carries a BFD packet will have, in addition to an IP header, a UDP header including a source port field and a destination port field.

Figure 24:
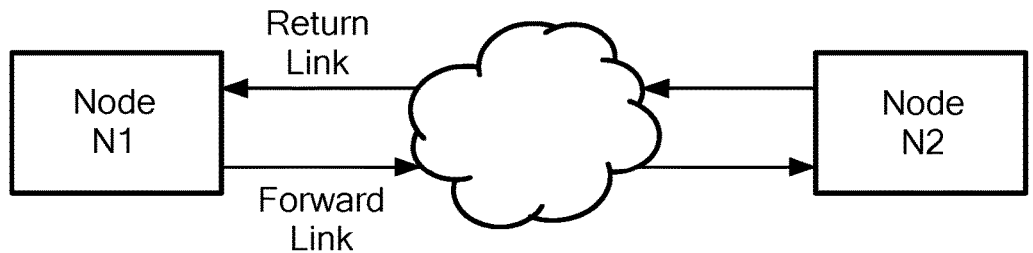
FIG. 24 is a schematic block diagram showing a communication system including two network nodes N1 and N2 in communication over a communication network, in accordance with one exemplary embodiment.

Exemplary embodiments are described herein with reference to FIG. 24, which is a schematic block diagram showing a communication system including two network nodes N1 and N2 in communication through a communication network. In the examples discussed below, Node N1 is the sending/source node for the augmented BFD session, while Node N2 is the receiving/target node for the augmented BFD session. In certain exemplary embodiments, the Nodes N1 and N2 exchange augmented BFD packets periodically (e.g., every 0.5 seconds) in order to monitor the status of the communication link between Nodes N1 and N2. It should be noted that the present invention is in no way limited to the exemplary communication system shown in FIG. 24 or to any particular communication system.

Figure 25:
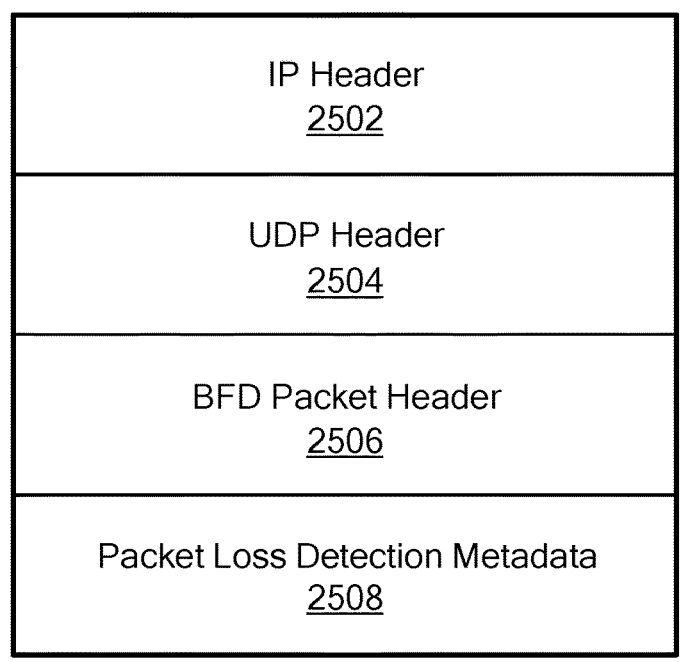
FIG. 25 is a schematic diagram of a message for conveying a BFD packet and additional metadata, in accordance with one exemplary embodiment.

FIG. 25 is a schematic diagram of a message 2500 for conveying a BFD packet and additional metadata, in accordance with one exemplary embodiment. The message 2500 includes an IP header 2502 including a source address field and a destination address field, a UDP header 2504 including a source port field and a destination port field, a BFD packet header 2506, and metadata 2508. In certain exemplary embodiments, the metadata 2508 is part of the BFD packet, e.g., following the "Required Min Echo RX Interval" field, with the "Length" field calculated to include the added metadata. In this respect, the BFD protocol may be modified, extended, or otherwise used to carry the metadata, e.g., using an optional Authentication Section or defining a separate metadata section for the BFD packet. The source and target nodes would be specially configured to support the additional metadata, e.g., adding of the metadata by the source node and processing received metadata by the target node.

Packets can get lost between nodes N1 and N2. For various reasons, it can be necessary or desirable to detect not only the loss of packets but also to determine whether packets are being lost on the communication link from Node N1 to Node N2 or on the communication link from Node N2 to Node N1. For example, identification of a faulty or error-prone communication link can be used to make routing decisions, such as to avoid the communication link or to only use the communication link for certain types of communication traffic.

Therefore, in accordance with one exemplary embodiment, Node N1 is configured to transmit link monitoring protocol messages to Node N2 including, as metadata, a forward sequence number that Node N1 increments for each link monitoring protocol message it transmits to Node N2. For each link monitoring protocol message received by Node N2 from Node N1, Node N2 is configured to return a link monitoring protocol message back to the Node N1 including, as metadata, the forward sequence number from the received link monitoring protocol message and a separate return sequence number that Node N2 increments for each link monitoring protocol message it returns to Node N1. Based on the sequence numbers in the link monitoring protocol messages received back from Node N2, Node N1 can determine if any packets were lost and, if so, also can determine whether the packets were lost on the outgoing communication link to Node N2 or on the incoming communication link from Node N2. The forward sequence numbers sent by Node N1 may allow Node N2 to determine whether any packets were lost on the incoming communication link from Node N1. Also, Node N1 may include return sequence numbers received from Node N2 in its link monitoring protocol messages, which may allow Node N2 to determine whether packets were lost on the outgoing communication link to Node N1.

Thus, in certain exemplary embodiments, the nodes exchange link monitoring protocol messages having the following information:

| Header | |
| --- | --- |
| SA/SP | (source address/source port number) |
| DA/DP | (destination address/destination port number) |
| Metadata | |
| Fwd Seq | (forward sequence number) |
| Ret Seq | (return sequence number) |

In certain exemplary embodiments, such link monitoring protocol messages may be augmented BFD messages using so-called "echo" mode. Generally speaking, BFD echo mode is intended for use where the receiving node (i.e., Node N2 in this example) simply returns the received packet back to the sending node (i.e., Node N1 in this example), typically by the forwarding path of the node without having the BFD message processed by the service path (or with minimal processing by the service path, if the receiving node does not have separate forwarding and service paths). However, in exemplary embodiments of the present invention, the receiving node (i.e., Node N2 in this example) is specially configured to insert a return sequence number in each link monitoring protocol message returned to the sending node.

Figure 26:
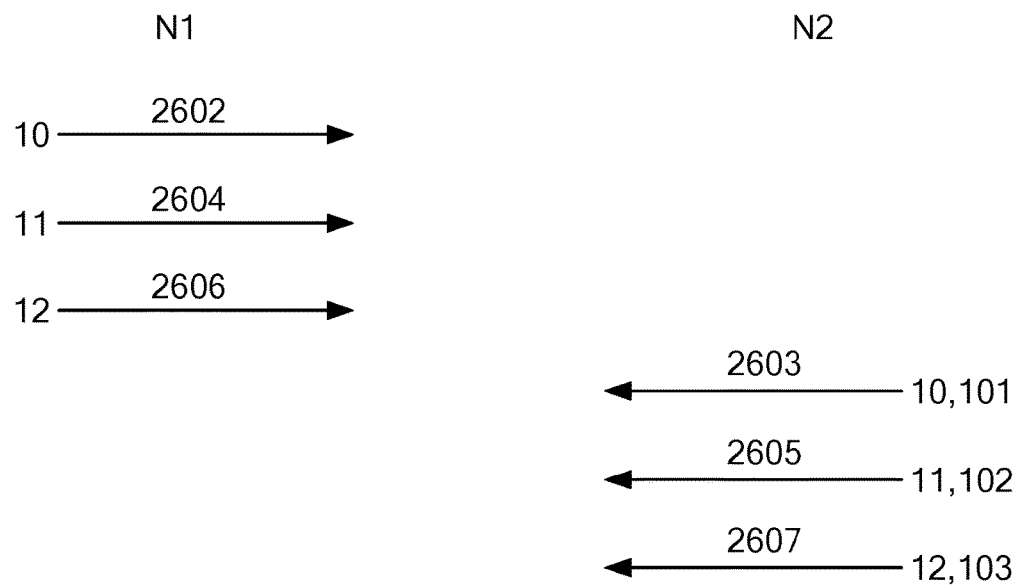
FIG. 26 is a message flow diagram demonstrating link status monitoring based on packet loss detection, in accordance with one exemplary embodiment.

FIG. 26 is a message flow diagram demonstrating link status monitoring based on packet loss detection, in accordance with one exemplary embodiment. Here, Node N1 transmits a series of link monitoring protocol messages including message 2602 with forward sequence number 10, message 2604 with forward sequence number 11, and message 2606 with forward sequence number 12. Node N2 transmits return link monitoring protocol messages including message 2603 with forward sequence number 10 and return sequence number 101 in response to message 2602, message 2605 with forward sequence number 11 and return sequence number 102 in response to message 2604, and message 2607 with forward sequence number 12 and return sequence number 103 in response to message 2606. Because Node N1 receives return link monitoring protocol messages in response to all of its transmitted link monitoring protocol messages with proper forward and return sequence numbers (i.e., there are no gaps in either the forward or return sequence numbers, and the sequence numbers are received in sequential order), then Node N1 can infer that there are no failures on either the outgoing communication link or the incoming communication link.

Figure 27:
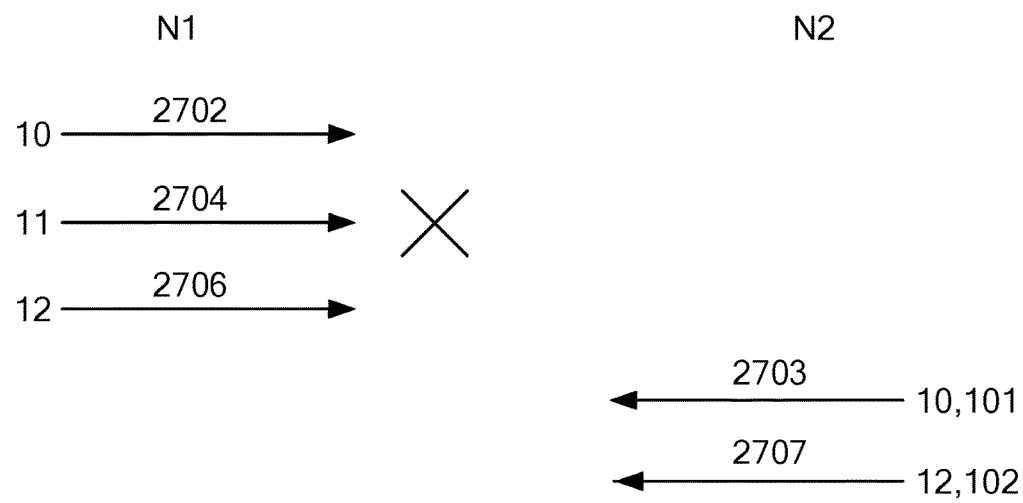
FIG. 27 is a message flow diagram demonstrating packet loss detection on the outgoing communication link, in accordance with one exemplary embodiment.

FIG. 27 is a message flow diagram demonstrating packet loss detection on the outgoing communication link, in accordance with one exemplary embodiment. Here, Node N1 transmits a series of link monitoring protocol messages including message 2702 with forward sequence number 10, message 2704 with forward sequence number 11, and message 2706 with forward sequence number 12. In this example, Node N2 does not receive message 2704 (represented by an "X"). Node N2 transmits return link monitoring protocol messages including message 2703 with forward sequence number 10 and return sequence number 101 in response to message 2702 and message 2707 with forward sequence number 12 and return sequence number 102 in response to message 2706. Thus, Node N1 can infer from received messages 2703 and 2707 that Node N2 did not receive message 2704 because the return sequence number 102 in return message 2707 corresponds to forward message 2704 rather than forward message 2706. Node N1 therefore can infer that message 2704 was lost on the outgoing communication link to Node N2.

Figure 28:
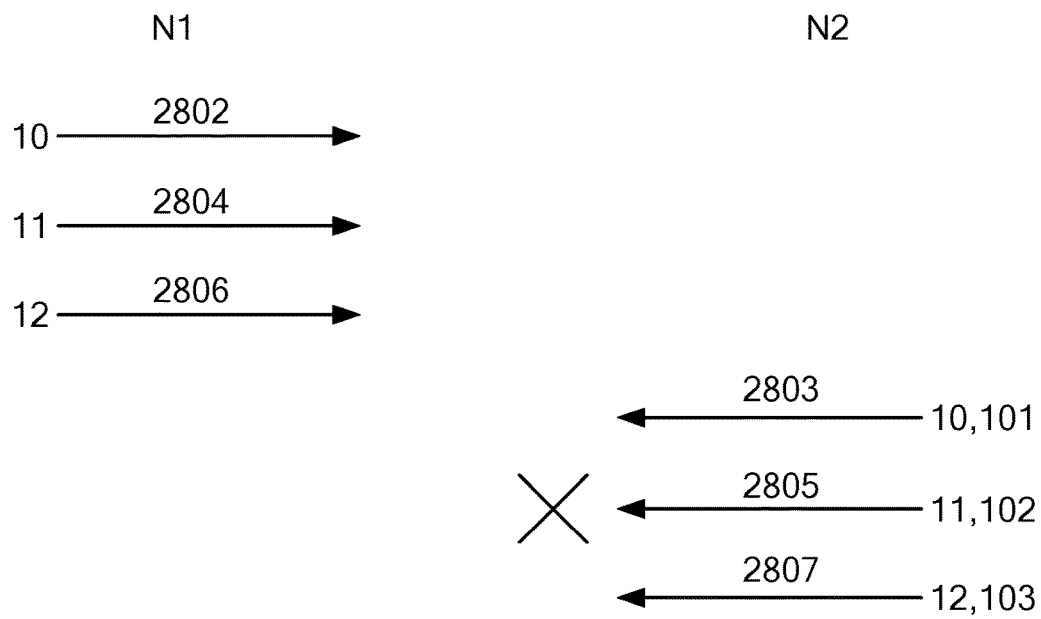
FIG. 28 is a message flow diagram demonstrating packet loss detection on the incoming communication link, in accordance with one exemplary embodiment.

FIG. 28 is a message flow diagram demonstrating packet loss detection on the incoming communication link, in accordance with one exemplary embodiment. Here, Node N1 transmits a series of link monitoring protocol messages including message 2802 with forward sequence number 10, message 2804 with forward sequence number 11, and message 2806 with forward sequence number 12. Node N2 transmits return link monitoring protocol messages including message 2803 with forward sequence number 10 and return sequence number 101 in response to message 2802, message 2805 with forward sequence number 11 and return sequence number 102 in response to message 2804, and message 2807 with forward sequence number 12 and return sequence number 103 in response to message 2806. In this example, Node N1 does not receive message 2805 (represented by an "X"). Thus, Node N1 can infer from received messages 2803 and 2807 that Node N2 received message 2804 but the return message 2805 was lost because return message 2807 includes the correct forward and reverse sequence numbers for responding to message 2806. Node N1 therefore can infer that message 2805 was lost on the incoming communication link from Node N2.

Figure 29:
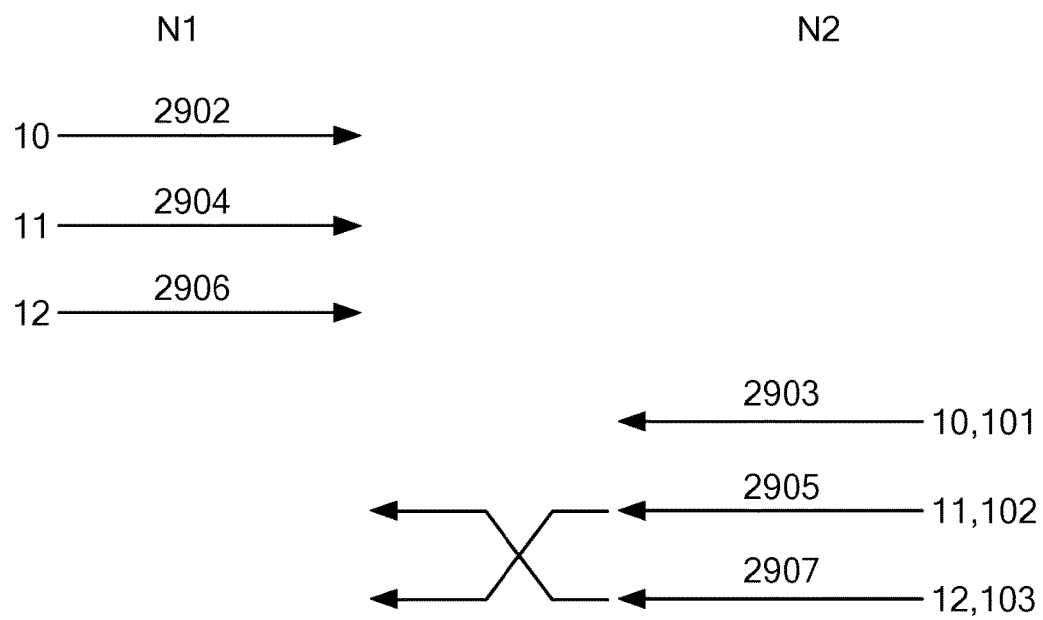
FIG. 29 is a message flow diagram demonstrating detection of an incoming communication link problem, in accordance with one exemplary embodiment.

FIG. 29 is a message flow diagram demonstrating detection of an incoming communication link problem, in accordance with one exemplary embodiment. Here, Node N1 transmits a series of link monitoring protocol messages including message 2902 with forward sequence number 10, message 2904 with forward sequence number 11, and message 2906 with forward sequence number 12. Node N2 transmits return link monitoring protocol messages including message 2903 with forward sequence number 10 and return sequence number 101 in response to message 2902, message 2905 with forward sequence number 11 and return sequence number 102 in response to message 2904, and message 2907 with forward sequence number 12 and return sequence number 103 in response to message 2906. In this example, Node N1 receives messages 2905 and 2907 out-of-order, i.e., Node N1 receives message 2907 before receiving message 2905. Thus, Node N1 can infer from received messages 2907 and 2905 that Node N2 received all forward messages in order and responded to the messages in order but the return messages arrived out-of-order. Node N1 therefore can infer that there was a problem on the incoming communication link from Node N2.

Figure 30:
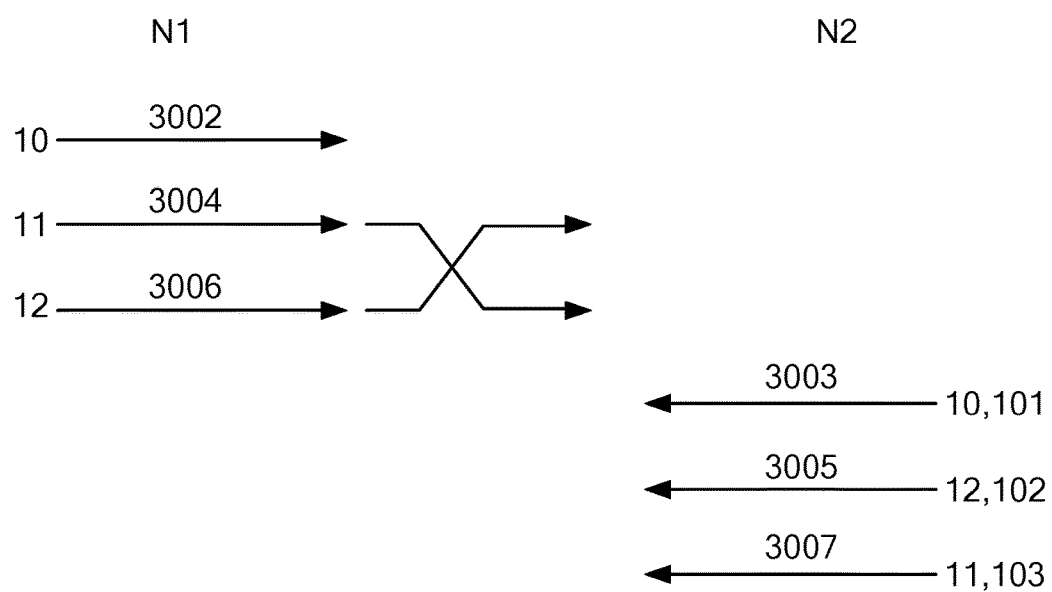
FIG. 30 is a message flow diagram demonstrating detection of an outgoing communication link problem, in accordance with one exemplary embodiment.

FIG. 30 is a message flow diagram demonstrating detection of an outgoing communication link problem, in accordance with one exemplary embodiment. Here, Node N1 transmits a series of link monitoring protocol messages including message 3002 with forward sequence number 10, message 3004 with forward sequence number 11, and message 3006 with forward sequence number 12. In this example, Node N2 receives messages 3004 and 3006 out-of-order, i.e., Node N2 receives message 3006 before receiving message 3004. Node N2 transmits return link monitoring protocol messages including message 3003 with forward sequence number 10 and return sequence number 101 in response to message 3002, message 3005 with forward sequence number 12 and return sequence number 102 in response to message 3006, and message 3007 with forward sequence number 11 and return sequence number 103 in response to message 3004. Thus, Node N1 can infer from received messages 3005 and 3007 that Node N2 received all forward messages but received messages 3004 and 3006 out-of-order. Node N1 therefore can infer that there was a problem on the outgoing communication link to Node N2.

Figure 31:
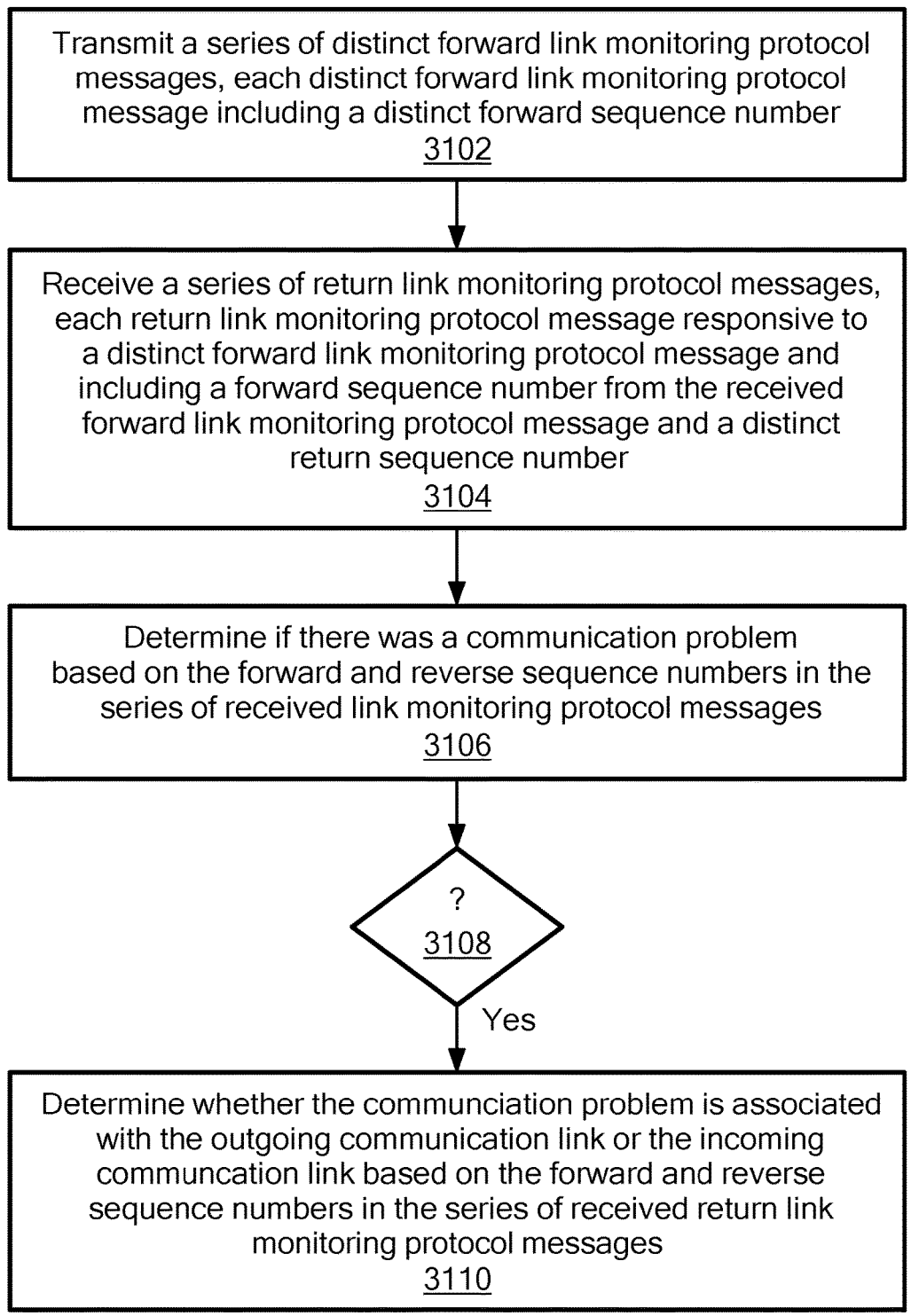
FIG. 31 is a flowchart for performing link status monitoring based on packet loss detection by the source node, in accordance with one exemplary embodiment.

FIG. 31 is a flowchart for performing link status monitoring based on packet loss detection by the source node, in accordance with one exemplary embodiment. In block 3102, the source node transmits a series of distinct forward link monitoring protocol messages, with each distinct forward link monitoring protocol message including a distinct forward sequence number. In block 3104, the source node receives a series of return link monitoring protocol messages, with each return link monitoring protocol message responsive to a distinct forward link monitoring protocol message and including a forward sequence number from the received forward link monitoring protocol message and a distinct return sequence number. In block 3106, the source node determines if there was a communication problem based on the forward and reverse sequence numbers in the series of received return link monitoring protocol messages. If the source node determines that there was a communication problem (YES in block 3108), then the source node determines whether the communication problem is associated with the outgoing communication link or the incoming communication link based on the forward and reverse sequence numbers in the series of received return link monitoring protocol messages, e.g., as discussed above.

Figure 32:
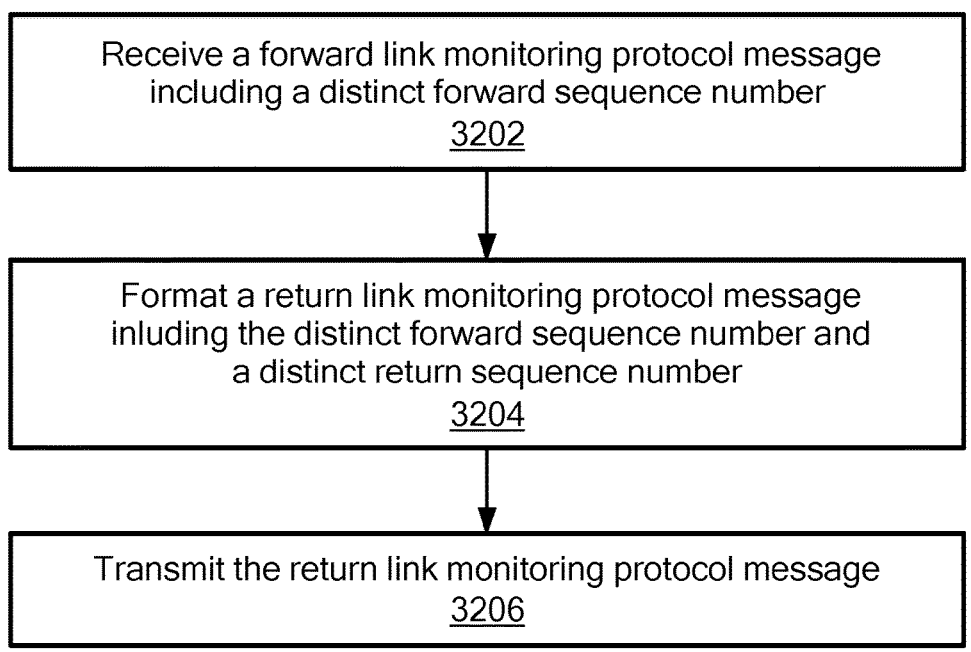
FIG. 32 is a flowchart for performing link status monitoring based on packet loss detection by the target node, in accordance with one exemplary embodiment.

FIG. 32 is a flowchart for performing link status monitoring based on packet loss detection by the target node, in accordance with one exemplary embodiment. In block 3202, the target node receives a forward link monitoring protocol message including a distinct forward sequence number. In block 3204, the target node formats a return link monitoring protocol message including the distinct forward sequence number and a distinct return sequence number. In block 3206, the target node transmits the return link monitoring protocol message destined for the source node.

As mentioned above, in certain exemplary embodiments, the link monitoring protocol messages may be augmented BFD messages that may be transmitted and processed by the forwarding path of the nodes.

It should be noted that, in each forward link monitoring protocol message, the source node may include a distinct return sequence number from a distinct received return link monitoring protocol message. In this way, the target node would be able to detect certain types of problems on both its outgoing communication link and its incoming communication link based on the forward and return sequence numbers received from the source node. For example, if there is a gap in forward sequence numbers, or if forward sequence numbers are out-of-order, the target node can infer that there was a problem on its incoming communication link. If there is gap in return sequence numbers, of if return sequence numbers are out-of-order, the target node can infer that there was a problem on its outgoing communication link. The target node can store such link status information, e.g., in its routing information base, and can use link status information in the same manner that the source node can use its link status information.

It should be noted that the source node typically transmits forward link monitoring protocol messages at a predetermined frequency (e.g., a message every X seconds or milliseconds, or a set of N messages every M seconds or milliseconds). The frequency at which the messages are sent affects the granularity with which link failure scenarios can be detected, with a higher frequency providing a higher granularity but also consuming more network bandwidth. Thus, different embodiments may use different frequencies.

Link Status Monitoring for Reverse FIB Enforcement

Link status information gathered using the link status monitoring techniques described above can be used in a variety of networking scenarios, from simply monitoring communication links to making complex routing or network reconfiguration changes.

In certain exemplary embodiments, the link status monitoring techniques described above may be used in the context of reverse Forwarding Information Base (FIB) enforcement for stateful routing as described in 4094/1021, which is hereby incorporated herein by reference. Here, an AIPR may use link status information when processing a first packet for a new session, specifically as part of deciding whether to establish the session and which interface to use for the return path for the session. For example, when a first packet for a new session arrives at an AIPR on a given ingress interface, the AIPR may determine whether the ingress interface is suitable for use in forwarding return session packets. In certain exemplary embodiments, determining whether the ingress interface is suitable for the return path includes first determining if the routing information base includes a valid route for the return path and, if there is a valid route for the return path, determining whether the next hop on the return path is associated with the ingress interface. If there is not a valid route for the return path and the next hop for the route is via the ingress interface, then the ingress interface is deemed to be suitable for the return path, otherwise the ingress interface is deemed to be not suitable for the return path. Additionally or alternatively, if a certain level of performance is required (e.g., bandwidth, error rate, latency, etc.), then the AIPR may determine whether the ingress interface can provide that level of performance for return packets, e.g., using link status information gathered using the link monitoring techniques described herein to determine link status based on packet loss. If the ingress interface is suitable for the return path, then the AIPR may continue to establish the session using the ingress port for the return path. If the ingress interface is not suitable for the return path, then the AIPR may drop the session (e.g., by either sending back a session rejection message or sending back no reply message) if the session is required to a bi-flow session or may try to use another interface for the return path if the session is not required to be a bi-flow session. For example, the AIPR may determine if one or more other interfaces are suitable for the return path and either continue to establish the session using an alternate interface that is suitable for the return path or drop the session if no interface is suitable for the return path. Link status information gathered using the link monitoring techniques described herein may be stored along with other routing information in a reverse FIB.

Link Status Monitoring with Source NAT Detection

In certain exemplary embodiments, certain nodes may exchange link monitoring protocol messages including both packet loss detection metadata as discussed above and source network address translator (NAT) detection metadata, as described in 4094/1018, which is hereby incorporated herein by reference. The source NAT detection metadata allows each node to determine the status of source NAT on communication links to and from the other node, e.g., if source NAT is present on the communication link, or if there is a change in source NAT configuration (e.g., from enabled to disabled, from disabled to enabled, or from one translation to another translation). The special metadata also allows true source information (e.g., source address and source port number) to be conveyed between nodes even in the presence of source NAT, because the source NAT device does not change the metadata in the message because the metadata is considered to be part of the message payload. In certain exemplary embodiments, knowledge regarding the presence of source NAT devices as well as the true source information conveyed through the source NAT devices via the special metadata can be used in the context of "stateful" routing.

An exemplary embodiments is now described with reference to the communication system shown in FIG. 24 in which the nodes exchange messages having the following information:

| Header | |
|---|---|
| SA/SP | (source address/source port number) |
| DA/DP | (destination address/destination port number) |
| Metadata | |
| Fwd Seq | (forward sequence number) |
| Ret Seq | (return sequence number) |
| Exp SA/SP | (expected source address/source port number) |
| Exp DA/DP | (expected destination address/destination port number) |
| Act SA/SP | (actual source address/source port number) |
| Act DA/DP | (actual destination address/destination port number) |

The header portion contains a "tuple" of actual address/port information used to route the message from the sending node to the receiving node. In this example, Node N1 addresses messages to Node N2 using appropriate address/port numbers, and Node N2 addresses message to Node N1 using appropriate address/port numbers. The source address and/or source port number in the header field are subject to being translated by a source NAT on the outgoing communication link from the sending node to the receiving node. Thus, the header information received by the receiving node may be different than the header information transmitted by the sending node.

The "expected" metadata contains a "tuple" specifying address/port information that the sending node expects to receive back in the header portion of messages received from the other node assuming no source NAT in either direction. Thus, in this example, Node N1 configures the "expected" metadata in messages it sends to Node N2 to be the address/port information it expects to receive from Node N2, and Node N2 configures the "expected" metadata in messages it sends to Node N1 to be the address/port information it expects to receive from Node N1. In certain exemplary embodiments, the "expected" metadata sent by Node N1 and the "expected" metadata sent by Node N2 includes a common set of session identification information, which are essentially "swapped" versions of one another, as described below.

The "actual" metadata contains a "tuple" specifying the actual address/port information that the sending node received in the header portion of the last message it received from the other node.

Each node stores a local copy of the last header information tuple it received from the other node and a local copy of the last "actual" metadata tuple it received from the other node.

When a node receives a message, if can determine if there is source NAT (or any change in source NAT status) on both the incoming communication link and the outgoing communication link, based on the information in the received messages and the local copies of information. Specifically, the node can determine if there is source NAT or a change in source NAT status on the incoming communication link by comparing the header information tuple in the received message with the local copy of the last header information received tuple—if the tuples are different, then there has been a change in source NAT status on the incoming communication link. Also, the node can determine if there is source NAT or a change in source NAT status on the outgoing communication link by comparing the "actual" metadata tuple in the received message with the local copy of the last "actual" information received tuple—if the tuples are different, then there has been a change in source NAT status on the outgoing communication link. If there has been a change in source NAT status on the incoming communication link and/or the outgoing communication link, then the node can determine the type of change (e.g., whether source NAT was enabled, disabled, or changed from one translation to another translation) based on the received information, the local copies, and the expected session identification information.

The following provides an example of a packet loss detection and source NAT detection protocol exchange when there is source NAT on both the communication link from Node N1 to Node N2 and the communication link from Node N2 to Node N1, in accordance with one exemplary embodiment. Node N1 (which is associated with a fictitious network address 1.1.1.1) transmits an initial link monitoring protocol message addressed to Node N2 (which is associated with a fictitious network address 2.2.2.2). Specifically, the message includes a header portion and a metadata portion, as follows:

| Header | |
|---|---|
| SA/SP | 1.1.1.1/1281 |
| DA/DP | 2.2.2.2/1280 |
| Metadata | |
| Fwd Seq | 10 |
| Ret Seq | 0 |
| Exp SA/SP | 2.2.2.2/1280 |
| Exp DA/DP | 1.1.1.1/1281 |
| Act SA/SP | 2.2.2.2/1280 |
| Act DA/DP | 1.1.1.1/1281 |

The metadata included by Node N1 includes a set of forward ("Fwd") and return ("Ret") sequence numbers (in this case, an initial forward and return sequence numbers).

The metadata included by Node N1 also includes an expected ("Exp") metadata tuple that reflects the original address/port information that Node N1 expects to receive back from Node N2 (assuming no source NAT device is present on the communication link from Node N1 to Node N2). Node N1 also includes an actual ("Act") metadata tuple that in this exemplary embodiment is initially the same as the "expected" metadata tuple (since there was no previous message received by Node N1 from Node N2). Node N1 stores the original address/port information, e.g., as part of its session-related data for stateful routing as discussed above, and may set up initial flows based on the original address/port information. Node N1 also stores a local copy of the expected header information and a local copy of the expected "actual" metadata. Thus, for example, Node N1 may store the following local copies:

| Node N1 LAST HEADER INFORMATION RECEIVED | |
|---|---|
| SA/SP | 2.2.2.2/1280 |
| DA/DP | 1.1.1.1/1281 |
| Node N1 LAST ACTUAL METADATA RECEIVED | |
| Act SA/SP | 1.1.1.1/1281 |
| Act DA/DP | 2.2.2.2/1280 |

Thus, Node N1 essentially initializes its LAST HEADER INFORMATION RECEIVED tuple to be the tuple it would expect to receive from Node N2 if there is no source NAT on the incoming communication link from Node N2 to Node N1 and initializes its LAST ACTUAL METADATA RECEIVED tuple to be the information it would expect to receive from Node N2 if there is no source NAT on the outgoing communication link from Node N1 to Node N2.

In this example, there is source NAT on the communication link from Node N1 to Node N2 that translates 1.1.1.1/1281 to 3.3.3.3/1381. Therefore, Node N2 may receive the following message including translated source information:

| Header | |
|---|---|
| SA/SP | 3.3.3.3/1381 |
| DA/DP | 2.2.2.2/1280 |
| Metadata | |
| Fwd Seq | 10 |
| Ret Seq | 0 |
| Exp SA/SP | 2.2.2.2/1280 |
| Exp DA/DP | 1.1.1.1/1281 |
| Act SA/SP | 2.2.2.2/1280 |
| Act DA/DP | 1.1.1.1/1281 |

Specifically, source address 1.1.1.1 has been translated to 3.3.3.3 and source port number 1281 has been translated to 1381.

Upon receipt of the message, Node N2 determines that the received message is for a new link monitoring protocol session. At this point Node N2 may not have initialized local copies of LAST HEADER INFORMATION RECEIVED tuple and LAST ACTUAL METADATA RECEIVED tuple since the received message is the first message received for this link monitoring protocol session. Node N2 therefore may initialize its local copy of LAST HEADER INFORMATION RECEIVED tuple based on the "expected" metadata tuple in message 2804 and its local copy of LAST ACTUAL METADATA RECEIVED tuple from the "actual" metadata tuple in the received message. Thus, for example, Node N2 may store the following initial local copies:

| Node N2 LAST HEADER INFORMATION RECEIVED | |
|---|---|
| SA/SP | 1.1.1.1/1281 |
| DA/DP | 2.2.2.2/1280 |
| Node N2 LAST ACTUAL METADATA RECEIVED | |
| Act SA/SP | 2.2.2.2/1280 |
| Act DA/DP | 1.1.1.1/1281 |

In order to determine if there is source NAT (or a change in source NAT status) on the incoming communication link from Node N1 to Node N2, Node N2 compares the address/port information tuple in the header with its local copy of LAST HEADER INFORMATION RECEIVED tuple. In this example, Node N2 can determine that there is source NAT on the communication link from Node N1 to Node N2, because the address/port information tuple in the header does not match the local copy of LAST HEADER INFORMATION RECEIVED tuple.

Also, in order to determine if there is source NAT (or a change in source NAT status) on the outgoing communication link from Node N2 to Node N1, Node N2 compares the "actual" metadata tuple in the received message with the local copy of LAST ACTUAL METADATA RECEIVED tuple. This comparison would allow Node N2 to determine if there is source NAT on the communication link from Node N2 to Node N1, although in this first message from Node N1, the "actual" metadata tuple in the message and the local copy of LAST ACTUAL METADATA RECEIVED tuple (which is based on the "expected" metadata in the message) are the same, so Node N2 initially determines that there is no source NAT on the communication link from Node N2 to Node N1 (even if there is, in fact, source NAT on that communication link).

Node N2 stores session information from the "expected" metadata and the header, e.g., as part of its session-related data for stateful routing as discussed above, and also may set up flows based on the received address/port information. Node N2 also updates the local copy of the LAST HEADER INFORMATION RECEIVED tuple and the local copy of the LAST ACTUAL METADATA RECEIVED tuple based on the received message. Thus, for example, Node N2 now may store the following local copies:

| Node N2 LAST HEADER INFORMATION RECEIVED (updated) | |
|---|---|
| SA/SP | 3.3.3.3/1381 |
| DA/DP | 2.2.2.2/1280 |
| Node N2 LAST ACTUAL METADATA RECEIVED (updated) | |
| Act SA/SP | 2.2.2.2/1280 |
| Act DA/DP | 1.1.1.1/1281 |

Node N2 transmits a return link monitoring protocol message addressed to Node N1, as follows.

| Header | |
|---|---|
| SA/SP | 2.2.2.2/1280 |
| DA/DP | 3.3.3.3/1381 |
| Metadata | |
| Fwd Seq | 10 |
| Ret Seq | 101 |
| Exp SA/SP | 1.1.1.1/1281 |
| Exp DA/DP | 2.2.2.2/1280 |
| Act SA/SP | 3.3.3.3/1381 |
| Act DA/DP | 2.2.2.2/1280 |

Here, Node N2 copies the address/port information from the header of the received message into the "actual" metadata of the return message and configures the "expected" address/port information in the return message to reflect the address/port information that Node N2 expects to receive back from Node N1 (assuming no source NAT device is present on the communication link from Node N2 to Node N1). Node N2 also returns the forward sequence number from the received message and adds a return sequence number.

Because there is source NAT in both directions in this example, Node N1 may receive the following message:

| Header | |
|---|---|
| SA/SP | 4.4.4.4/1480 |
| DA/DP | 1.1.1.1/1281 |
| Metadata | |
| Fwd Seq | 10 |
| Ret Seq | 101 |
| Exp SA/SP | 1.1.1.1/1281 |
| Exp DA/DP | 2.2.2.2/1280 |
| Act SA/SP | 3.3.3.3/1381 |
| Act DA/DP | 2.2.2.2/1280 |

Here, the destination address and destination port number have been restored by the source NAT device, from 3.3.3.3/1381 to 1.1.1.1/1281, and the source address and source port number have been translated by the source NAT device, from 2.2.2.2/1280 to 4.4.4.4/1480.

In order to determine if there is source NAT (or a change in source NAT status) on the outgoing communication link from Node N1 to Node N2, Node N1 compares the "actual" metadata tuple (i.e., the actual address/port information received by Node N2) with its local copy of LAST ACTUAL METADATA RECEIVED tuple. In this example, Node N1 can determine that there is source NAT on the outgoing communication link from Node N1 to Node N2 because the "actual" metadata tuple received in the received message does not match the local copy of LAST ACTUAL METADATA RECEIVED tuple. In certain embodiments, Node N1 may reconfigure a flow associated with the session upon detecting the presence of the source NAT on the outgoing communication link, as discussed below.

Also, in order to determine if there is source NAT (or a change in source NAT status) on the incoming communication link from Node N2 to Node N1, Node N1 compares the address/port information tuple in the header with its local copy of LAST HEADER INFORMATION RECEIVED tuple. In this example, Node N1 can determine that there is source NAT on the incoming communication link from Node N2 to Node N1, because the address/port information tuple in the header does not match its local copy of LAST HEADER INFORMATION RECEIVED tuple. In certain embodiments, Node N1 may reconfigure a flow associated with the session upon detecting the presence of the source NAT on the incoming communication link, as discussed below. Node N1 also stores a local copy of the header information tuple and a local copy of the "actual" metadata tuple. Thus, for example, Node N1 now may store the following local copies:

| Node N1 LAST HEADER INFORMATION RECEIVED (updated) | |
|---|---|
| SA/SP | 4.4.4.4/1480 |
| DA/DP | 1.1.1.1/1281 |
| Node N1 LAST ACTUAL METADATA RECEIVED (updated) | |
| Act SA/SP | 3.3.3.3/1381 |
| Act DA/DP | 2.2.2.2/1280 |

Node N1 transmits a second link monitoring protocol message to Node N2, as follows:

| Header | |
|---|---|
| SA/SP | 1.1.1.1/1281 |
| DA/DP | 4.4.4.4/1480 |

| Metadata | |
|---|---|
| Fwd Seq | 11 |
| Ret Seq | 101 |
| Exp SA/SP | 2.2.2.2/1280 |
| Exp DA/DP | 1.1.1.1/1281 |
| Act SA/SP | 4.4.4.4/1480 |
| Act DA/DP | 1.1.1.1/1281 |

Here, Node N1 copies the address/port information tuple from the header of the received message into the "actual" metadata tuple of the second message and configures the "expected" metadata tuple in the second message to reflect the address/port information that Node N1 expects to receive back from Node N2 (which is the same as in the original message). Node N1 also increments the forward sequence number to 11 and may include the received return sequence number of 101 in the metadata.

Because there is a source NAT device in this example, Node N2 may receive the following message:

| Header | |
|---|---|
| SA/SP | 3.3.3.3/1381 |
| DA/DP | 2.2.2.2/1280 |
| Metadata | |
| Fwd Seq | 11 |
| Ret Seq | 101 |
| Exp SA/SP | 2.2.2.2/1280 |
| Exp DA/DP | 1.1.1.1/1281 |
| Act SA/SP | 4.4.4.4/1480 |
| Act DA/DP | 1.1.1.1/1281 |

In order to determine if there is source NAT (or a change in source NAT status) on the outgoing communication link from Node N2 to Node N1, Node N2 compares the "actual" metadata tuple (i.e., the actual address/port information received by Node N1) with its local copy of LAST ACTUAL METADATA RECEIVED tuple. In this example, Node N2 now can determine that there is source NAT on the outgoing communication link from Node N2 to Node N1 because the "actual" metadata tuple in the received message does not match the local copy of LAST ACTUAL METADATA RECEIVED tuple. Node N2 may reconfigure a flow associated with the session upon detecting the presence of the source NAT on the outgoing communication link, as discussed below.

Also, in order to determine if there is source NAT (or a change in source NAT status) on the incoming communication link from Node N1 to Node N2, Node N2 compares the address/port information tuple in the header of the received message with its local copy of LAST HEADER INFORMATION RECEIVED tuple. In this example, Node N2 can determine that there has been no change in source NAT status on the communication link from Node N1 to Node N2, because the address/port information tuple in the header of the received message matches the local copy of LAST HEADER INFORMATION RECEIVED tuple.

Node N2 updates its local copy of LAST HEADER INFORMATION RECEIVED tuple and its local copy of the LAST ACTUAL METADATA RECEIVED tuple based on the received message. Thus, for example, Node N2 now may store the following local copies:

| Node N2 LAST HEADER INFORMATION RECEIVED (updated) | |
|---|---|
| SA/SP | 3.3.3.3/1381 |
| DA/DP | 2.2.2.2/1280 |
| Node N2 LAST ACTUAL METADATA RECEIVED (updated) | |
| Act SA/SP | 4.4.4.4/1480 |
| Act DA/DP | 1.1.1.1/1281 |

Using this mechanism, a node can determine not only that a change in source NAT status occurred, but also the type of source NAT status change. The example given above demonstrates various cases of a node detecting a change from no source NAT to source NAT enabled on a communication link. This mechanism also allows a node to detect source NAT becoming disabled on a communication link (e.g., if the last message received by Node N2 had been received with SA/SP of 1.1.1.1/1281, Node N2 would have detected the change because the address/port information in the header would not have matched the local copy of expected header information but instead would have matched Node N2's expected address/port information. Similarly, this mechanism allows a node to detect a change in address translations (e.g., if the last message received by Node N2 had been received with SA/SP of 5.5.5.5/1581, Node N2 would have detected the change because the address/port information in the header would not have matched the local copy of expected header information and also would not have matched Node N2's expected address/port information.

It should be noted that the common set of "expected" address/port information carried in the messages between Nodes N1 and N2 allow each node to associate the link monitoring protocol message with its associated session, even in the presence of source NAT in both directions.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the REX processor) are necessarily non-conventional because, absent special programming or configuration, the conventional components do not inherently perform the described non-conventional functions.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A system comprising:
   a source node comprising a first plurality of communication interfaces, a first memory storing first routing information, and a first packet router; and
   a target node comprising a second plurality of communication interfaces, a second memory storing second routing information, and a second packet router,
   wherein the source node is configured to transmit a series of distinct forward link monitoring protocol messages destined for the target node over a first communication interface of the source node according to the stored first routing information, each distinct forward link monitoring protocol message having a metadata portion including a distinct forward sequence number; receive a series of return link monitoring protocol messages from the target node over a second communication interface of the source node, each return link monitoring protocol message responsive to a distinct forward link monitoring protocol message and having a metadata portion including a forward sequence number from the received forward link monitoring protocol message and a distinct return sequence number; determine if a communication problem occurred based on the forward and reverse sequence numbers in the series of received return link monitoring protocol messages; and when the source node determines that a communication problem occurred, determine whether the communication problem is associated with an outgoing communication link to the target node or an incoming communication link from the target node based on the forward and reverse sequence numbers in the series of received return link monitoring protocol messages; and
   wherein the target node is configured to receive a forward link monitoring protocol message including a distinct forward sequence number over a first communication interface of the target node, format a return link monitoring protocol message including the distinct forward sequence number and a distinct return sequence number, and transmit the return link monitoring protocol message destined for the source node over a second communication interface of the target node according to the stored second routing information.

2. A system according to claim 1, wherein the forward and return link monitoring protocol messages are augmented Bidirectional Forwarding Detection (BFD) messages.

3. A system according to claim 1, wherein the source node increments the forward sequence number for each forward link monitoring protocol message it transmits, and wherein the target node increments the return sequence number for each return link monitoring protocol message it transmits.

4. A method of link status monitoring by a source node in a communication system, the source node in communication with a target node, the method comprising:
   transmitting, by a source node destined for the target node, a series of distinct forward link monitoring protocol messages, each distinct forward link monitoring protocol message having a metadata portion including a distinct forward sequence number;
   receiving, by the source node from the target node, a series of return link monitoring protocol messages, each return link monitoring protocol message responsive to a distinct forward link monitoring protocol message and having a metadata portion including a forward sequence number from the received forward link monitoring protocol message and a distinct return sequence number;
   determining, by the source node, if a communication problem occurred based on the forward and reverse sequence numbers in the series of received return link monitoring protocol messages; and
   when the source node determines that a communication problem occurred, determining, by the source node, whether the communication problem is associated with an outgoing communication link to the target node or an incoming communication link from the target node based on the forward and reverse sequence numbers in the series of received return link monitoring protocol messages.

5. A method according to claim 4, wherein the forward and return link monitoring protocol messages are augmented Bidirectional Forwarding Detection (BFD) messages.

6. A method according to claim 4, wherein the source node increments the forward sequence number for each forward link monitoring protocol message it transmits.

7. A source node for use with a target node, the source node comprising:
   a memory for storing routing information;
   a plurality of communication interfaces; and
   a packet router configured to implement a link status monitoring method comprising:
   transmitting, by the packet router over a first communication interface according to the stored routing information, a series of distinct forward link monitoring protocol messages destined for the target node, each distinct forward link monitoring protocol message having a metadata portion including a distinct forward sequence number;
   receiving, by the packet router from the target node over a second communication interface, a series of return link monitoring protocol messages, each return link monitoring protocol message responsive to a distinct forward link monitoring protocol message and having a metadata portion including a forward sequence number from the received forward link monitoring protocol message and a distinct return sequence number;
   determining, by the packet router, if a communication problem occurred based on the forward and reverse sequence numbers in the series of received return link monitoring protocol messages; and
   when the packet router determines that a communication problem occurred, determining, by the packet router, whether the communication problem is associated with an outgoing communication link to the target node or an incoming communication link from the target node based on the forward and reverse sequence numbers in the series of received return link monitoring protocol messages.

8. A source node according to claim 7, wherein the forward and return link monitoring protocol messages are augmented Bidirectional Forwarding Detection (BFD) messages.

9. A source node according to claim 7, wherein the packet router increments the forward sequence number for each forward link monitoring protocol message it transmits.

10. A computer program product comprising a tangible, non-transitory computer readable medium having embodied therein a computer program that, when run on at least one computer processor, implements a packet router for a source node, the packet router implementing a link status monitoring method comprising:
   transmitting, by the packet router, a series of distinct forward link monitoring protocol messages, each distinct forward link monitoring protocol message having a metadata portion including a distinct forward sequence number;
   receiving, by the packet router, a series of return link monitoring protocol messages, each return link monitoring protocol message responsive to a distinct forward link monitoring protocol message and having a metadata portion including a forward sequence number from the received forward link monitoring protocol message and a distinct return sequence number;
   determining, by the packet router, if a communication problem occurred based on the forward and reverse sequence numbers in the series of received return link monitoring protocol messages; and
   when the packet router determines that a communication problem occurred, determining, by the packet router, whether the communication problem is associated with an outgoing communication link to the target node or an incoming communication link from the target node based on the forward and reverse sequence numbers in the series of received return link monitoring protocol messages.

11. A computer program product according to claim 10, wherein the forward and return link monitoring protocol messages are augmented Bidirectional Forwarding Detection (BFD) messages.

12. A computer program product according to claim 10, wherein the packet router increments the forward sequence number for each forward link monitoring protocol message it transmits.

13. A method of link status monitoring by a target node in a communication system, the method comprising:
   receiving, by the target node from a source node, a forward link monitoring protocol message having a metadata portion including a distinct forward sequence number;
   formatting, by the target node, a return link monitoring protocol message having a metadata portion including the distinct forward sequence number and a distinct return sequence number; and
   transmitting the return link monitoring protocol message by the target node to the source node.

14. A method according to claim 13, wherein the forward and return link monitoring protocol messages are augmented Bidirectional Forwarding Detection (BFD) messages.

15. A method according to claim 13, wherein the target node increments the return sequence number for each return link monitoring protocol message it transmits.

16. A target node for use with a source node configured to transmit a series of distinct forward link monitoring protocol messages to the target node, each distinct forward link monitoring protocol message having a metadata portion including a distinct forward sequence number, the target node comprising:
   a memory for storing routing information;
   a plurality of communication interfaces; and
   a packet router configured to implement a link status monitoring method comprising:
   receiving, by the packet router from the source node over a first communication interface, at least one of the forward link monitoring protocol messages from the source node, each received forward link monitoring protocol message having a metadata portion including a distinct forward sequence number; and
   for each received forward link monitoring protocol message:
   (a) formatting, by the packet router, a return link monitoring protocol message having a metadata portion including the distinct forward sequence number from the received forward link monitoring protocol message and a distinct return sequence number; and
   (b) transmitting the return link monitoring protocol message by the packet router destined for the source node over a second communication interface according to the stored routing information, wherein the return link monitoring protocol messages enable the source node to determine if a communication problem occurred based on the forward and reverse sequence numbers in return link monitoring protocol messages received from the target node, and when the source node determines that a communication problem occurred, further enable the source node to determine whether the communication problem is associated with an outgoing communication link to the target node or an incoming communication link from the target node based on the forward and reverse sequence numbers in the received return link monitoring protocol messages.

17. A target node according to claim 16, wherein the forward and return link monitoring protocol messages are augmented Bidirectional Forwarding Detection (BFD) messages.

18. A target node according to claim 16, wherein the packet router increments the return sequence number for each return link monitoring protocol message it transmits.

19. A computer program product comprising a tangible, non-transitory computer readable medium having embodied therein a computer program that, when run on at least one computer processor, implements a packet router for a target node that is used with a source node configured to transmit a series of distinct forward link monitoring protocol messages to the target node, each distinct forward link monitoring protocol message having a metadata portion including a distinct forward sequence number, the packet router implementing a link status monitoring method comprising:

receiving, by the packet router from the source node, at least one of the forward link monitoring protocol messages from the source node, each received forward link monitoring protocol message having a metadata portion including a distinct forward sequence number; and for each received forward link monitoring protocol message:

(a) formatting, by the packet router, a return link monitoring protocol message having a metadata portion including the distinct forward sequence number from the received forward link monitoring protocol message and a distinct return sequence number; and (b) transmitting the return link monitoring protocol message by the packet router destined for the source node, wherein the return link monitoring protocol messages enable the source node to determine if a communication problem occurred based on the forward and reverse sequence numbers in return link monitoring protocol messages received from the target node, and when the source node determines that a communication problem occurred, further enable the source node to determine whether the communication problem is associated with an outgoing communication link to the target node or an incoming communication link from the target node based on the forward and reverse sequence numbers in the received return link monitoring protocol messages.

20. A computer program product according to claim 19, wherein the forward and return link monitoring protocol messages are augmented Bidirectional Forwarding Detection (BFD) messages.

21. A computer program product according to claim 19, wherein the packet router increments the return sequence number for each return link monitoring protocol message it transmits.

* * * * *